(12) United States Patent
Kadkol et al.

(10) Patent No.: US 11,106,430 B1
(45) Date of Patent: Aug. 31, 2021

(54) CIRCUIT AND METHOD FOR CALCULATING NON-LINEAR FUNCTIONS OF FLOATING-POINT NUMBERS

(71) Applicant: FACEBOOK, INC., Menlo Park, CA (US)

(72) Inventors: Anup Ramesh Kadkol, Sunnyvale, CA (US); Krishnakumar Nair, Newark, CA (US)

(73) Assignee: FACEBOOK, INC., Menlo Park, CA (US)

( * ) Notice: Subject to any disclaimer, the term of this patent is extended or adjusted under 35 U.S.C. 154(b) by 182 days.

(21) Appl. No.: 16/414,701

(22) Filed: May 16, 2019

(51) Int. Cl.
*G06F 7/485* (2006.01)
*G06N 3/04* (2006.01)
*G06F 17/11* (2006.01)
*G06F 1/03* (2006.01)

(52) U.S. Cl.
CPC ............. *G06F 7/485* (2013.01); *G06F 1/03* (2013.01); *G06F 17/11* (2013.01); *G06N 3/0481* (2013.01)

(58) Field of Classification Search
CPC ............. G06F 7/485; G06F 1/03; G06F 17/11
See application file for complete search history.

(56) References Cited

U.S. PATENT DOCUMENTS

| | | | |
|---|---|---|---|
| 5,184,317 A * | 2/1993 | Pickett | G06F 1/035 708/272 |
| 7,640,285 B1 * | 12/2009 | Oberman | G06F 7/57 708/272 |
| 8,150,902 B2 * | 4/2012 | Bates | G06F 7/5235 708/524 |
| 2020/0225948 A1 * | 7/2020 | Sim | G06F 9/3001 |

* cited by examiner

*Primary Examiner* — Michael D. Yaary
(74) *Attorney, Agent, or Firm* — Morgan, Lewis & Bockius LLP

(57) ABSTRACT

A circuit and method for calculating a non-linear function of floating-point numbers using hierarchical look-up tables are provided. The look-up tables are programmable to hold non-linear ranges of values for any of a variety of non-linear functions. The circuit includes computation modules in respective stages of a high-throughput computation pipeline. A first computation module in a first stage receives one or more floating-point numbers and, for each floating-point number, selects a first entry from a first look-up table based on the floating-point number. The first computation module then calculates and outputs a table index and a variable based on the first floating-point number and the first entry. The second compute module in a second stage, selects a second entry from a second look-up table based on the table index, and calculates and outputs an approximate value for the non-linear function using the variable and the second entry.

20 Claims, 13 Drawing Sheets

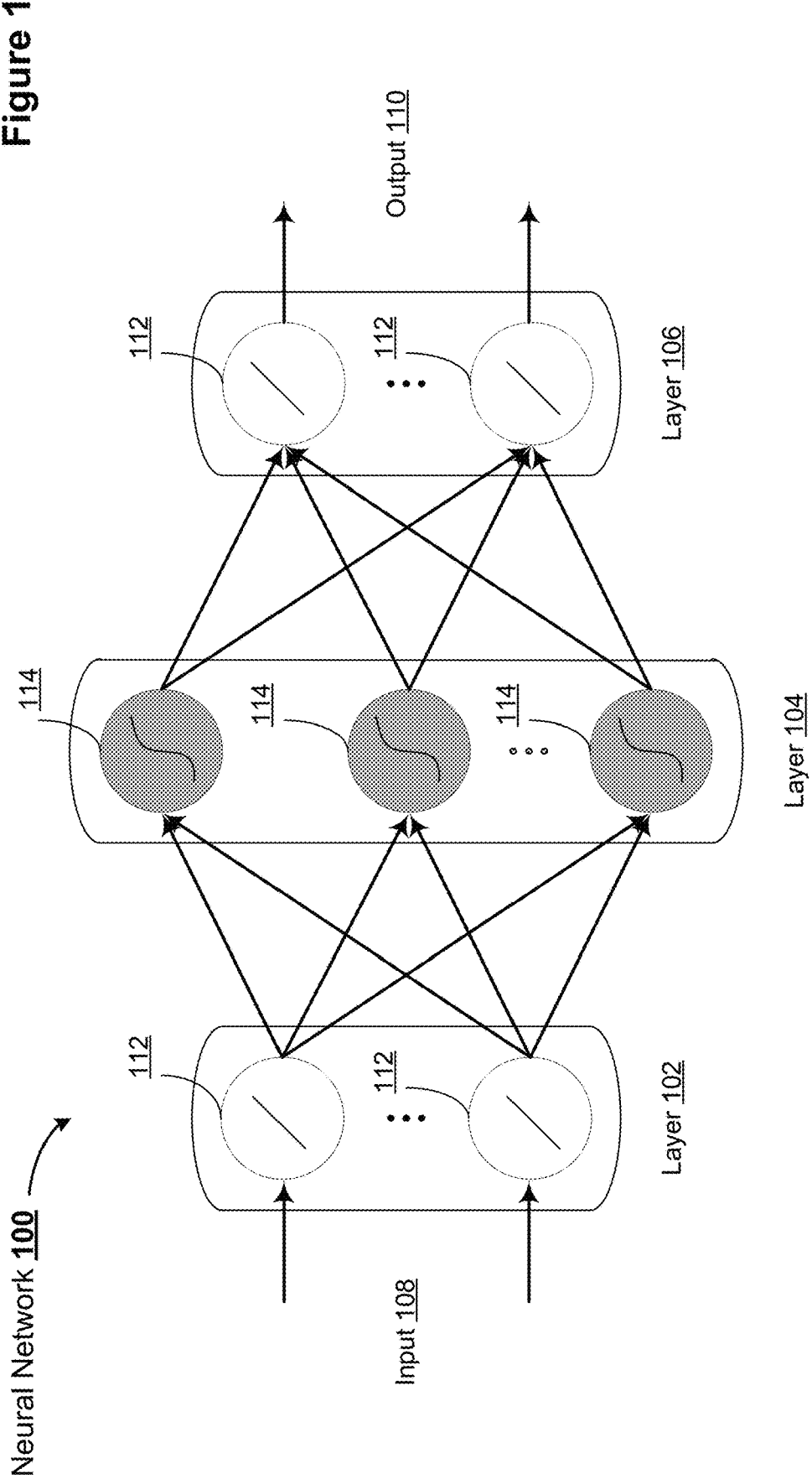

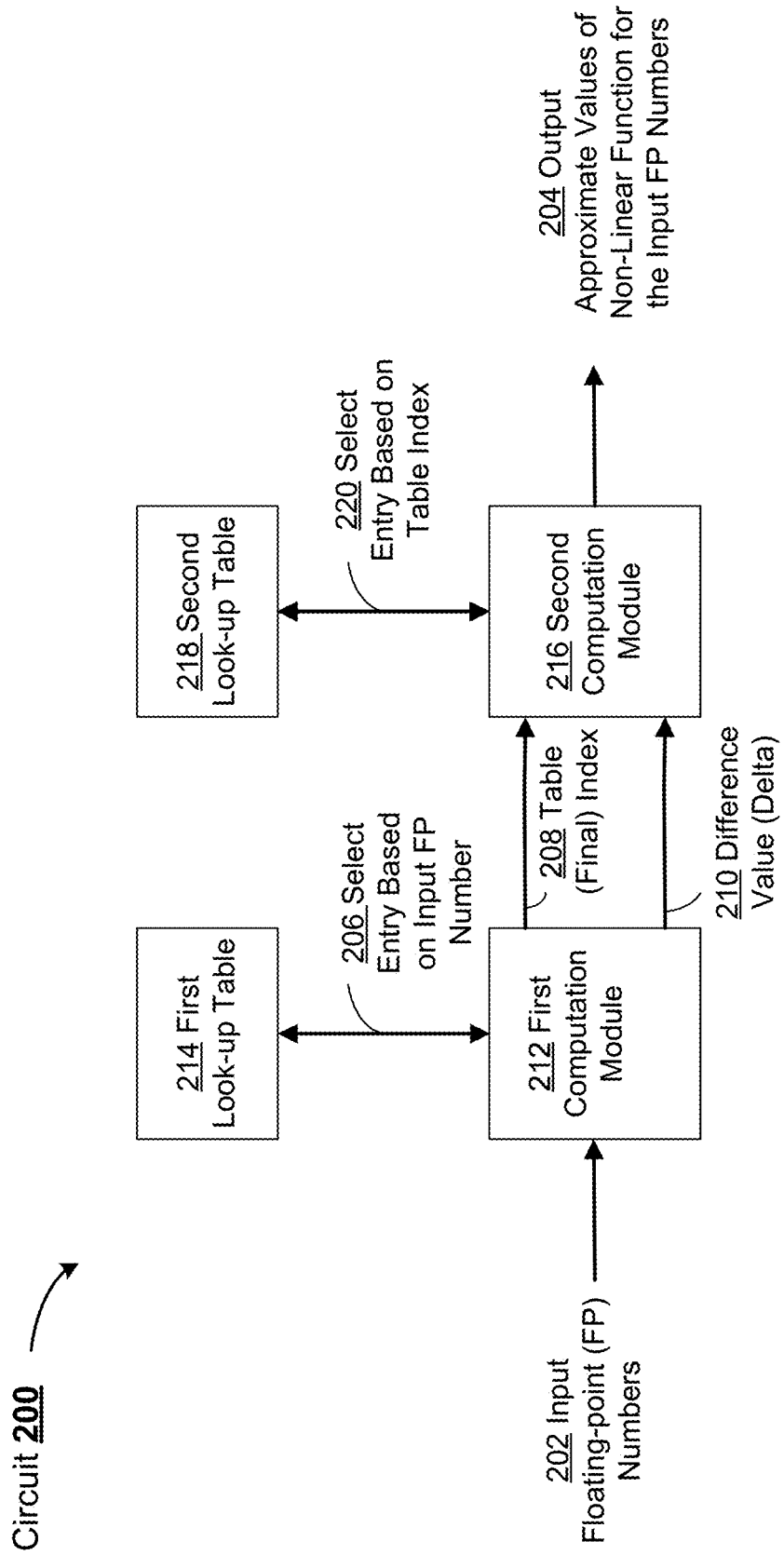

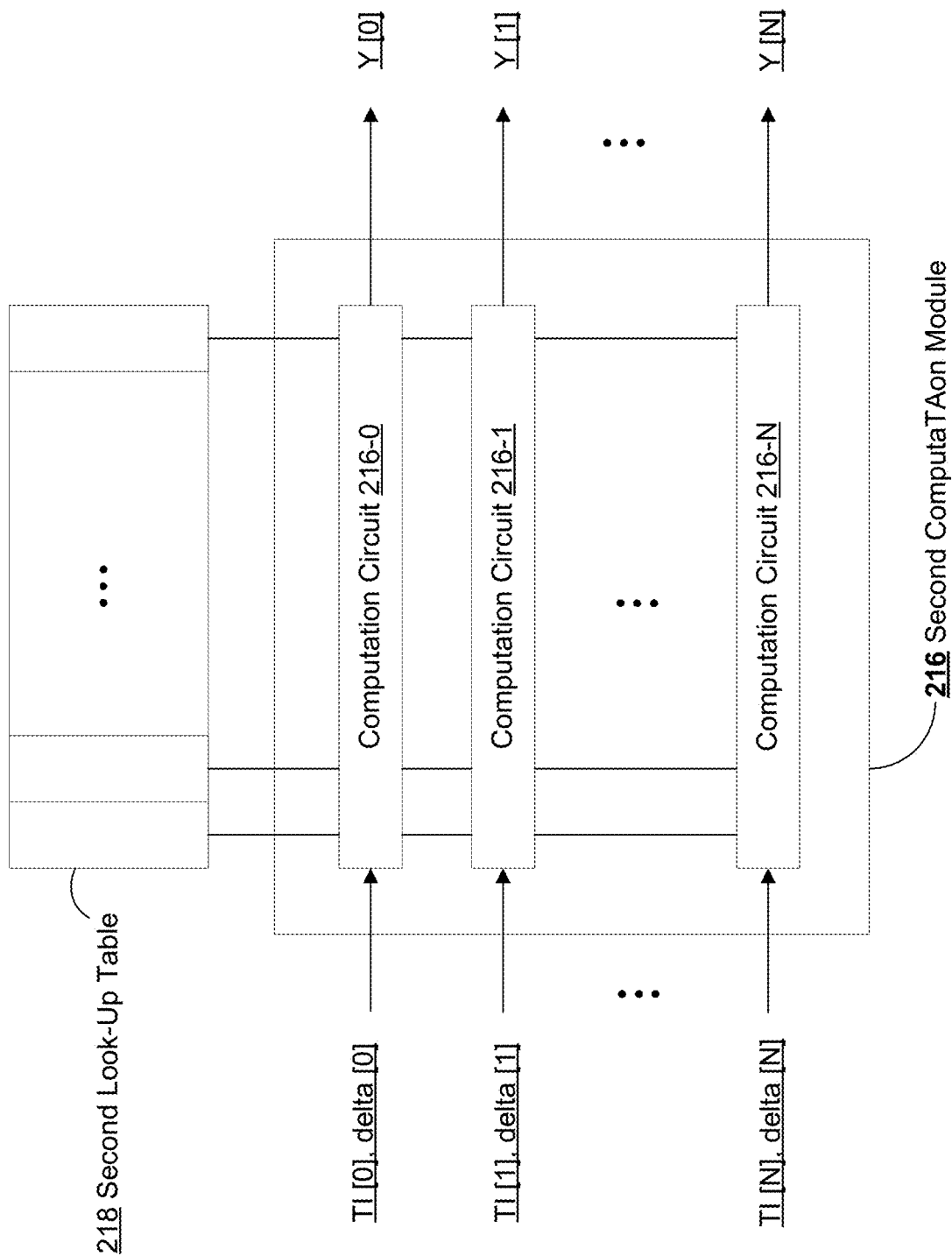

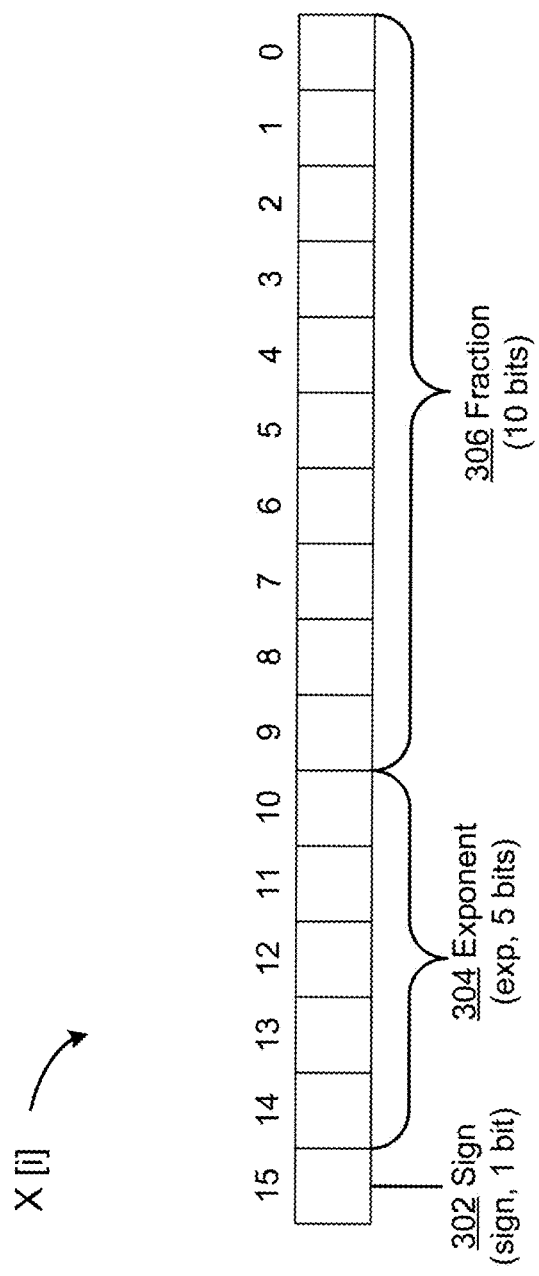

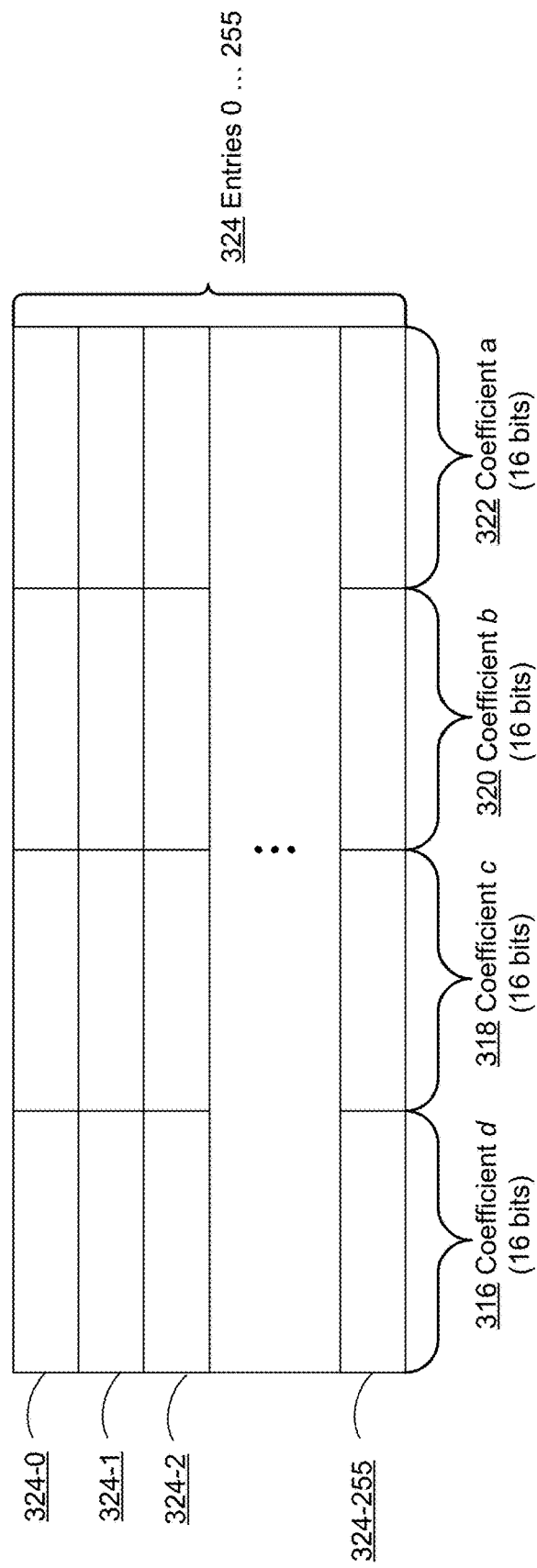

CIRCUIT AND METHOD FOR CALCULATING NON-LINEAR FUNCTIONS OF FLOATING-POINT NUMBERS

TECHNICAL FIELD

The disclosed implementations relate generally to digital hardware for artificial intelligence and more specifically to a circuit and method for calculating non-linear functions of floating-point numbers.

BACKGROUND

Computation-intensive artificial intelligence tasks have prompted the creation of a wide variety of custom hardware to perform these tasks efficiently. For example, neural networks have one or more layers of neurons that compute non-linear activation functions. Non-linear activation functions are more complex than linear activation functions and require substantial hardware. Because programming non-linear activation functions using general purpose processors (e.g., CPUs) causes communication overhead, non-linear functions in neural networks are typically implemented on high-performance specialized hardware with on-chip specialized cores for performing non-linear functions (e.g., GPUs, or other type of accelerators).

As neural networks become more prevalent, neural network hardware needs to support an ever growing list of non-linear functions (e.g., sigmoid, sin h, tan h, exponent, softmax, log, leaky ReLU, and ReLU). Neural network hardware also needs to be programmable to suit emerging applications while satisfying performance considerations.

SUMMARY

Accordingly, there is a need for circuit and method for programmable, scalable, and efficient calculation of non-linear functions of floating-point numbers. The circuit and method described herein uses hierarchical programmable look-up tables and approximation techniques to calculate non-linear functions for floating-point numbers.

In one aspect, some implementations include a circuit for calculating a non-linear function of floating-point numbers. The circuit includes a first memory unit for storing a first look-up table of a first plurality of entries, and a second memory unit for storing a second look-up table of a second plurality of entries. The circuit also includes a plurality of computation modules in respective stages of a first computation pipeline. The plurality of computation modules includes a first computation module in a first stage of the first computation pipeline. The first computation module is configured to receive one or more floating-point numbers, select a first entry from the first look-up table based on a first floating-point number of the one or more floating-point numbers, and calculate and output a table index and a difference value based on the first floating-point number and the first entry.

The plurality of computation modules also includes a second computation module in a second stage of the first computation pipeline. The second computation module is coupled to the first computation module. The second computation module is configured to receive the table index and the difference value output by the first computation module, select a second entry from the second look-up table based on the table index, and calculate and output an approximate value for the non-linear function based on the difference value and the second entry.

In some implementations, the one or more floating point numbers include a plurality of floating point numbers, and the first computation module includes a first plurality of computation circuits. Each of the first plurality of computation circuits is operable in parallel to: receive a respective floating point number of the plurality of floating-point numbers; select a respective entry from the first look-up table based on the respective floating-point number; and calculate and output a respective table index and a respective difference value based on the respective entry and the respective floating-point number.

In some implementations, the one or more floating point numbers include a plurality of floating point numbers and the first computation module outputs a plurality of table indices and a plurality of difference values corresponding to respective ones of the plurality of floating point numbers. The second computation module includes a second plurality of computation circuits. Each of the second plurality of computation circuits is operable in parallel to: receive a respective a table index of the plurality of table indices and a respective difference value of the plurality of difference values; select a respective entry from the second look-up table based on the respective table index; and calculate and output a respective approximate value for the non-linear function based on the respective difference value and the respective entry.

In some implementations, each floating-point number received by the first computation module is represented using a sign-bit, one or more exponent bits, and one or more fraction bits, and the first computation module includes a first sub-circuit configured to select the first entry from the first look-up table based on the sign bit and the one or more exponent bits of the first floating-point number. In some implementations, each floating-point number received by the first computation module is a half-precision binary floating-point number with 1 sign bit and 5 exponent bits, the first look-up table has 64 entries, and the first sub-circuit is a multiplexer configured to select the first entry from the 64 entries by indexing the first look-up table using the 1 sign bit and the 5 exponent bits.

In some implementations, each floating-point number received by the first computation module is represented using a sign-bit, one or more exponent bits, and one or more fraction bits, and each entry of the first plurality of entries includes a base index, a number of most significant bits, and a seed value. The first computation module includes a second sub-circuit configured to receive the first entry, to extract the base index and the number of most significant bits included in the first entry, to extract one or more significant bits from the one or more fraction bits equal to the number of most significant bits, and to use the base index and the one or more significant bits to calculate the table index. The first computation module also includes a third sub-circuit configured to receive the first entry, and to extract and use the seed value included in the first entry to calculate the difference value.

In some implementations, the second sub-circuit includes the second sub-circuit includes a most significant bit extractor circuit to extract the one or more significant bits from the one or more fraction bits, and an adder circuit configured to add the base index and the number of most significant bits included in the respective entry to calculate the table index.

In some implementations, the third sub-circuit includes a subtractor circuit configured to subtract the seed value included in the first entry from the first floating-point number to obtain the difference value.

In some implementations, the table index output by the first computation module is an 8-bit value, the second look-up table has 256 entries, and the second computation module includes a multiplexer configured to select the second entry from the 256 entries by indexing the second look-up table using the 8-bit table index.

In some implementations, each entry of the second plurality of entries includes a plurality of coefficient values, and the second computation module is further configured to calculate the approximate value using the plurality of coefficient values included in the second entry. In some implementations, the second computation module includes one or more sub-circuits configured to receive the plurality of coefficient values and calculate the approximate value using polynomial approximation. In some implementations, the one or more sub-circuits form a second computation pipeline to progressively compute the approximate value.

In some implementations, the plurality of coefficient values includes at least 4 co-efficient values a, b, c, and d. The one or more sub-circuits includes: a first floating-point multiply adder circuit in a first stage of the second computation pipeline configured to receive a, b and delta, and calculate and output a first intermediate component of the approximate value based on a, b and delta (the difference value); a first floating-point multiplier circuit in the first stage of the second computation pipeline configured to receive delta, and calculate and output a second intermediate component of the approximate value based on delta; a second floating-point multiply adder circuit in a second stage of the second computation pipeline configured to receive c and the first intermediate component, and calculate and output a third intermediate component of the approximate value based on c and the first intermediate component; a second floating-point multiplier circuit configured in the second stage of the second computation pipeline configured to receive delta and the second intermediate component, and calculate and output a fourth intermediate component of the approximate value based on delta and the second intermediate component; and a third floating-point multiply adder circuit in a third stage of the second computation pipeline configured to receive d, the third intermediate component and the fourth intermediate component, and calculate and output the approximate value based on d, the third intermediate component and the fourth intermediate component.

In some implementations, each entry of the first plurality of entries include values pre-determined for the non-linear function for a first pre-determined set of floating-point numbers, and each entry of the second plurality of entries include values pre-determined for the non-linear function for a second pre-determined set of floating-point numbers In some implementations, the first look-up table and the second look-up table are configured so as to store a greater number of entries for a first range of floating-point numbers compared to a second range of floating-point numbers, wherein the first range and the second range are equal in size.

In some implementations, the first look-up table and the second-look-up table are programmable to hold entries corresponding to a specific non-linear function and a set of floating-point numbers.

In another aspect, a method for calculating a non-linear function of floating-point numbers is provided. The method includes receiving one or more floating-point numbers, and for each of the one or more floating-point numbers: selecting a first entry from a first look-up table based on a first floating-point number of the one or more floating-point numbers; calculating a table index and a difference value based on the first floating-point number and the first entry; selecting a second entry from a second look-up table based on the table index; and calculating and outputting an approximate value for the non-linear function based on the difference value and the second entry.

In some implementations, each entry of the first look-up table includes a base index, a number of most significant bits, and a seed value, and the method further comprises: calculating the table index based on the base index and the number of most significant bits included in the first entry; and calculating the difference value based on the seed value included in the first entry.

In some implementations, each entry of the second look-up table includes a plurality of co-efficient values, and the method further comprises calculating the approximate value using the plurality of co-efficient values using polynomial approximation.

In some implementations, the method further comprises programming the first look-up table and the second look-up table to hold entries corresponding to a specific non-linear function and a set of floating-point numbers so as to store a greater number of entries for a first range of the set of floating-point numbers compared to a second range of the set of floating-point numbers, wherein the first range and the second range are equal in size.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIG. 1 illustrates a neural network with a non-linear layer including one or more circuits for calculating one or more non-linear functions of floating-point numbers, according to some implementations.

FIG. 2A is a block diagram illustrating a circuit for calculating a non-linear function of floating-point numbers, according to some implementations.

FIG. 2C is a block diagram illustrating a second computation module in a circuit for calculating a non-linear function of floating-point numbers, according to some implementations.

FIG. 3A illustrates an input floating-point number, according to some implementations.

FIG. 3C illustrates a second look-up table in a circuit for calculating a non-linear function of floating-point numbers, according to some implementations.

DESCRIPTION OF IMPLEMENTATIONS

Figure 2B:
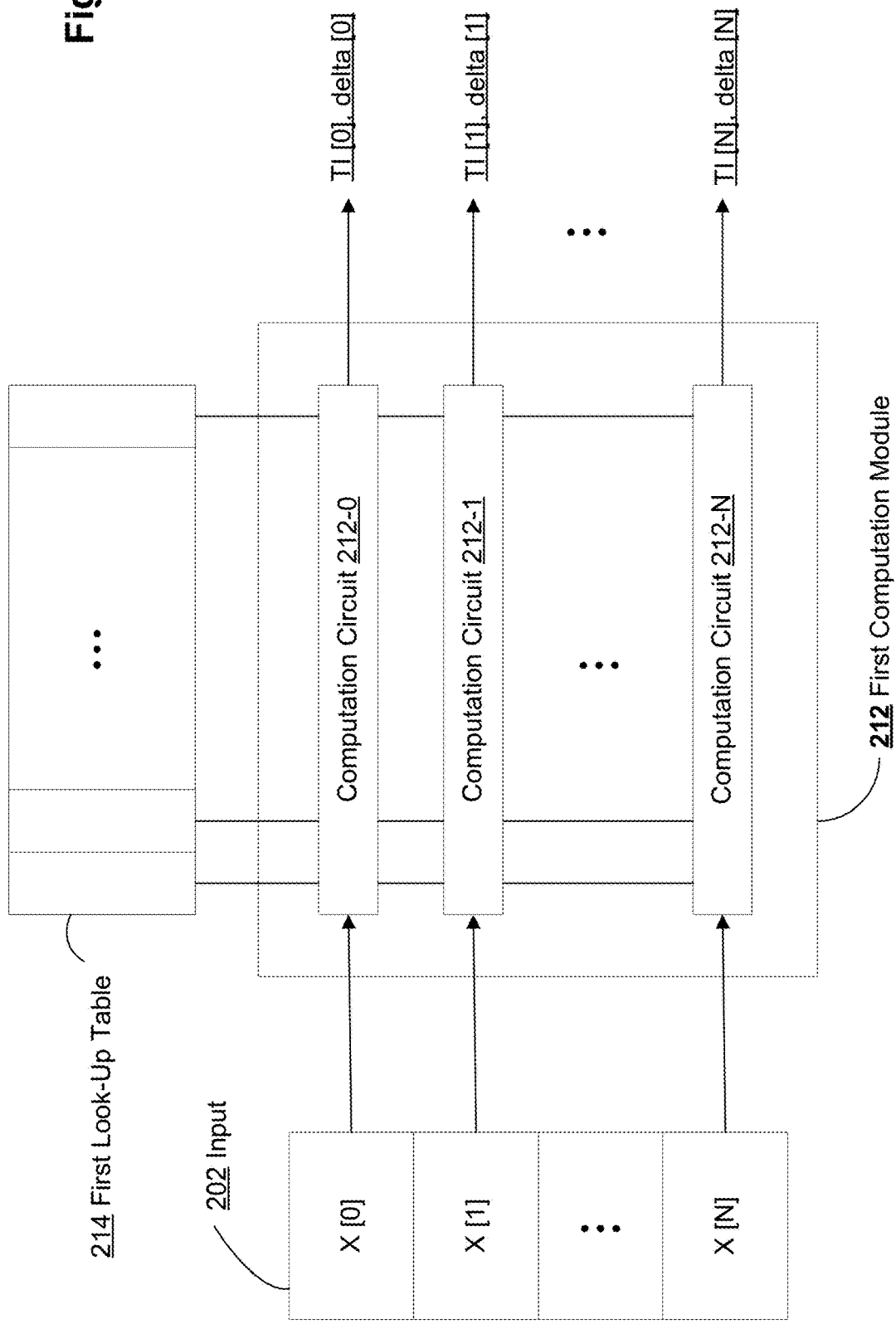
FIG. 2B is a block diagram illustrating a first computation module in a circuit for calculating a non-linear function of floating-point numbers, according to some implementations.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first electronic device could be termed a second electronic device, and, similarly, a second electronic device could be termed a first electronic device, without departing from the scope of the various described implementations. The first electronic device and the second electronic device are both electronic devices, but they are not necessarily the same electronic device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

FIG. 1 illustrates a neural network 100 including a non-linear layer 104 between linear layers 102 and 106, according to some implementations. Linear layer 102 accepts one or more data items as input 108. In some implementations, linear layer 102 is the first neural network layer. In some implementations, linear layer 102 is part of a larger neural network and accepts input 108 from a preceding layer of neurons. Linear layer 102 includes one or more neurons 112 that compute linear activation functions (e.g., linear polynomials) based on input 108. The various neurons in a layer can compute the same or different activation functions depending on the configuration of the neural network 100. Linear layer 102 produces output that is input to the next layer of neurons (e.g., non-linear layer 104). In this example, non-linear layer 104 (sometimes called a hidden layer) takes as input the output produced by the linear layer 102. Non-linear layer 104 includes neurons 114 that compute non-linear activation functions (e.g., sigmoid, sine, cosine) based on the input. Neurons 114 can be configured to perform one or more non-linear activation functions in various implementations. The output from non-linear layer 104 is input to linear layer 106, according to some implementations. Although the example shows the output of non-linear layer 104 is input to linear layer 106, various other configurations are possible whereby the output from non-linear layer 104 is input to another linear or non-linear layer that produces an output that is in turn input to a next layer of neurons (e.g., layer 106). Neurons 112 can be configured to perform different linear activation functions, according to some implementations. In the example shown, linear layer 106 produces output 110 that can be further processed or used to produce an overall output for neural network 100.

FIG. 2A is a block diagram illustrating a circuit 200 for calculating a non-linear function of floating-point numbers, which can be used to perform the functions of a neuron 114, according to some implementations. Circuit 200 includes a first memory unit for storing a first look-up table 214 of a first plurality of entries. Circuit 200 also includes a second memory unit for storing a second look-up table 218 of a second plurality of entries. Circuit 200 further includes a plurality of computation modules in respective stages of a first computation pipeline, according to some implementations. The plurality of computation modules includes a first computation module 212 in a first stage (e.g., pipeline stage 1) of the first computation pipeline. The first computation module 212 is configured to receive one or more input floating-point numbers 202, and for each input floating-point number, select (206) a first entry from the first look-up table 214 based on the input floating-point number. The first computation module 212 also calculates and outputs a table index 208 and a difference value 210 based on the input floating-point number and the selected entry.

Circuit 200 further includes a second computation module 216 in a second stage (e.g., pipeline stage 2) of the first computation pipeline, according to some implementations. The second computation module 216 is coupled to the first computation module 212. The second computation module 216 is configured to receive the table index (208) and the difference value (210) output by the first computation module 212, and select (220) a second entry from the second look-up table 218 based on the table index. The second computation module 216 also calculates and outputs an approximate value 204 for the non-linear function based on the difference value 210 and the second entry.

FIG. 2B is a block diagram illustrating the first computation module 212, input 202, and the first look-up table 214, according to some implementations. In some implementations, the one or more floating point numbers (input 202) include a plurality of floating point numbers X [0], X [1], . . . , X [N]. The first computation module 212 includes a first plurality of computation circuits (212-0, 212-1, . . . , 212-N) operable in parallel to receive, at each of the first plurality of computation circuits, a respective floating point number of the plurality of floating-point numbers X [0], X [1], . . . , X [N]. Each of the first plurality of computation circuits also selects, in parallel, a respective entry from the first look-up table 214 based on the respective floating-point number. The first-look-up table 214 is organized such that the plurality of computation circuits can operate concurrently such that each computation circuit (e.g., computation circuit 212-0) selects and reads a respective entry from the table based on its respective input floating-point number (e.g., floating point number X [0]). Each of the plurality of computation circuits subsequently calculates and outputs a respective table index and a respective difference value based on the respective entry and the respective floating-point number. Thus, in some implementations, the plurality of computation circuits (212-0, 212-1, . . . , 212-N) output concurrently and respectively a plurality of table indices (TI [0], TI [1], . . . , TI[N]) and a plurality of difference values (delta [0], delta [1], . . . delta [N]), corresponding to respective ones of the plurality of floating point numbers (X [0], X [1], . . . , X [N]).

FIG. 2C is a block diagram illustrating the second computation module 216, input 208 and 210, and the second look-up table 218, according to some implementations. The second computation module 216 includes a second plurality of computation circuits (216-0, 216-1, . . . , 216-N) operable in parallel to receive, at each of the second plurality of computation circuits (e.g., computation circuit 216-0), a respective a table index (e.g., table index TI [0]) of the plurality of table indices (TI [0], TI [1], . . . , TI[N]), and to receive a respective difference value (e.g., difference value delta [0]) of the plurality of difference values (delta [0], delta [1], . . . delta [N]), in accordance with some implementations. The second plurality of computation circuits (216-0, 216-1, . . . , 216-N) can operate concurrently to select, at each of the second plurality of computation circuits (e.g., computation circuit 216-0), a respective entry from the second look-up table 218 based on the respective table index (e.g., TI [0]), and calculate and output, at each of the second plurality of computation circuits (e.g., computation circuit 216-0), a respective approximate value (e.g., approximate value Y [0]) for the non-linear function based on the respective difference value and the respective entry. The second look-up table 218 is configured so that the second plurality of computation circuits 216-0, 216-1, . . . , 216-N can concurrently select and read their respective entries from the table. Thus, in some implementations, the second plurality of computation circuits (216-0, 216-1, . . . , 216-N) output concurrently and respectively a plurality of approximate values (Y [0], Y[1], Y [N]) corresponding to respective ones of the plurality of floating point numbers (X [0], X [1], . . . , X [N]).

FIG. 3A illustrates an exemplary input floating-point number X [i], i=1, 2, . . . , N (of the plurality of floating-point numbers 202) based on IEEE 754 2008 binary 16 format (sometimes called half-precision), according to some implementations. In the example shown, the floating-point number includes a sign bit 302, 5 exponent bits 304, and 10 fraction bits 306. Although the example illustrated shows a particular order and format, the sign bit, exponent bits and faction bits can be reordered in various implementations.

Figure 3B:
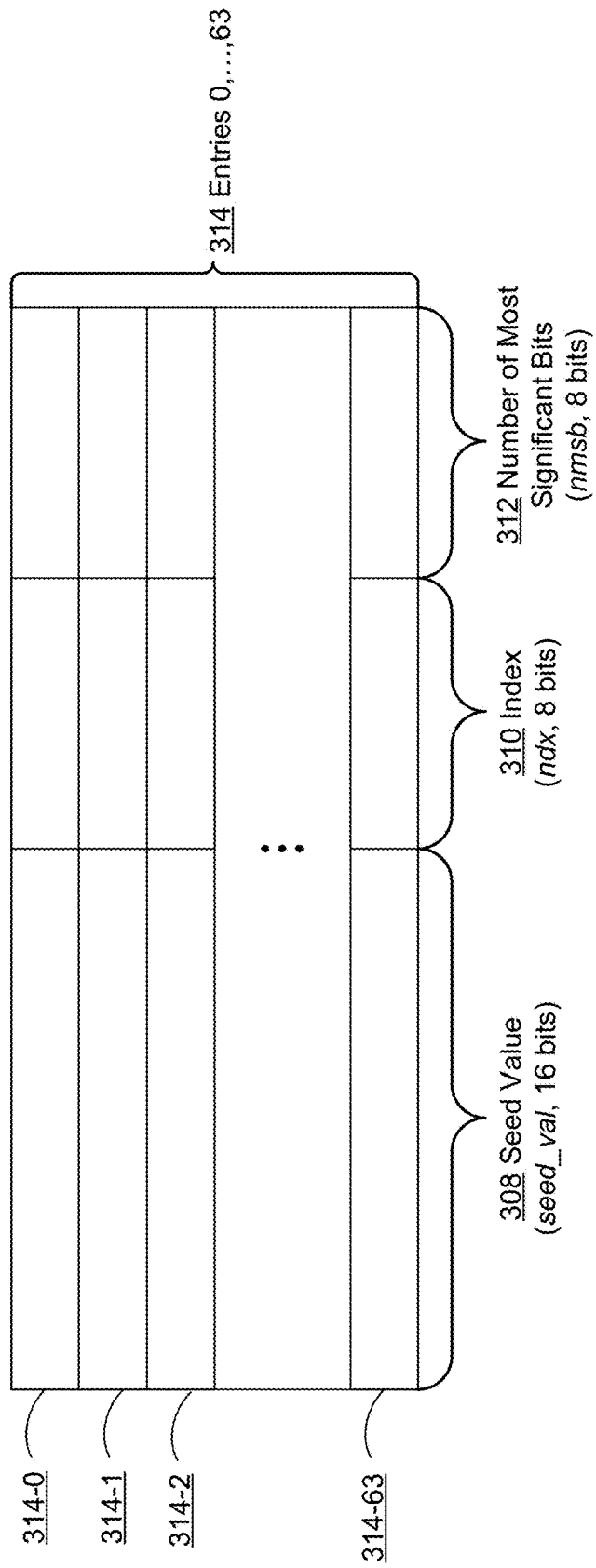
FIG. 3B illustrates a first look-up table in a circuit for calculating a non-linear function of floating-point numbers, according to some implementations.

FIG. 3B illustrates an exemplary organization of the first look-up table 214, according to some implementations. As shown, in some implementations, each entry of the first plurality of entries of first look-up table 214 includes a base index 310 (ndx), a number of most significant bits 312 (nmsb), and a seed value 308 (seed_val). In the example shown, first look-up table 214 has 64 entries 314 (i.e., entries 0, . . . , 63), each entry including a seed value that is 16 bits in length, an index that is 8 bits in length, and a number of most significant bits that is 8 bits in length. In various implementations, the seed value, index, and number of most significant bits can be arranged differently than the order shown in FIG. 3B.

FIG. 3C illustrates an example organization of the second look-up table 218, according to some implementations. In the example shown, table 218 includes 256 entries 324 (i.e., entries 0, . . . 255), each entry including four 16-bit co-efficient values d (316), c (318), b (320), and a (322). In various implementations, table 214 may include a different number of co-efficient values (e.g., more than 4 co-efficient values in each entry). In some implementations, the size of each co-efficient value may be larger than 16 bits. In various implementations, the co-efficient values are arranged differently compared to the order in FIG. 3C (e.g., a followed by b followed by c followed by d).

In some implementations, the first look-up table 214 and the second-look-up table 218 are programmable to hold entries corresponding to a specific non-linear function and/or a specific range of floating-point numbers. Various implementations use different optimization techniques to organize the entries in the look-up tables for specific non-linear functions. For example, the first look-up table 214 and the second look-up table 218 can be configured so as to store a greater number of entries for a first range of floating-point numbers compared to a second range of floating-point numbers, although the first range and the second range can be equal in size.

Programming the Look-Up Tables for Various Non-Linear Functions

Figure 4:
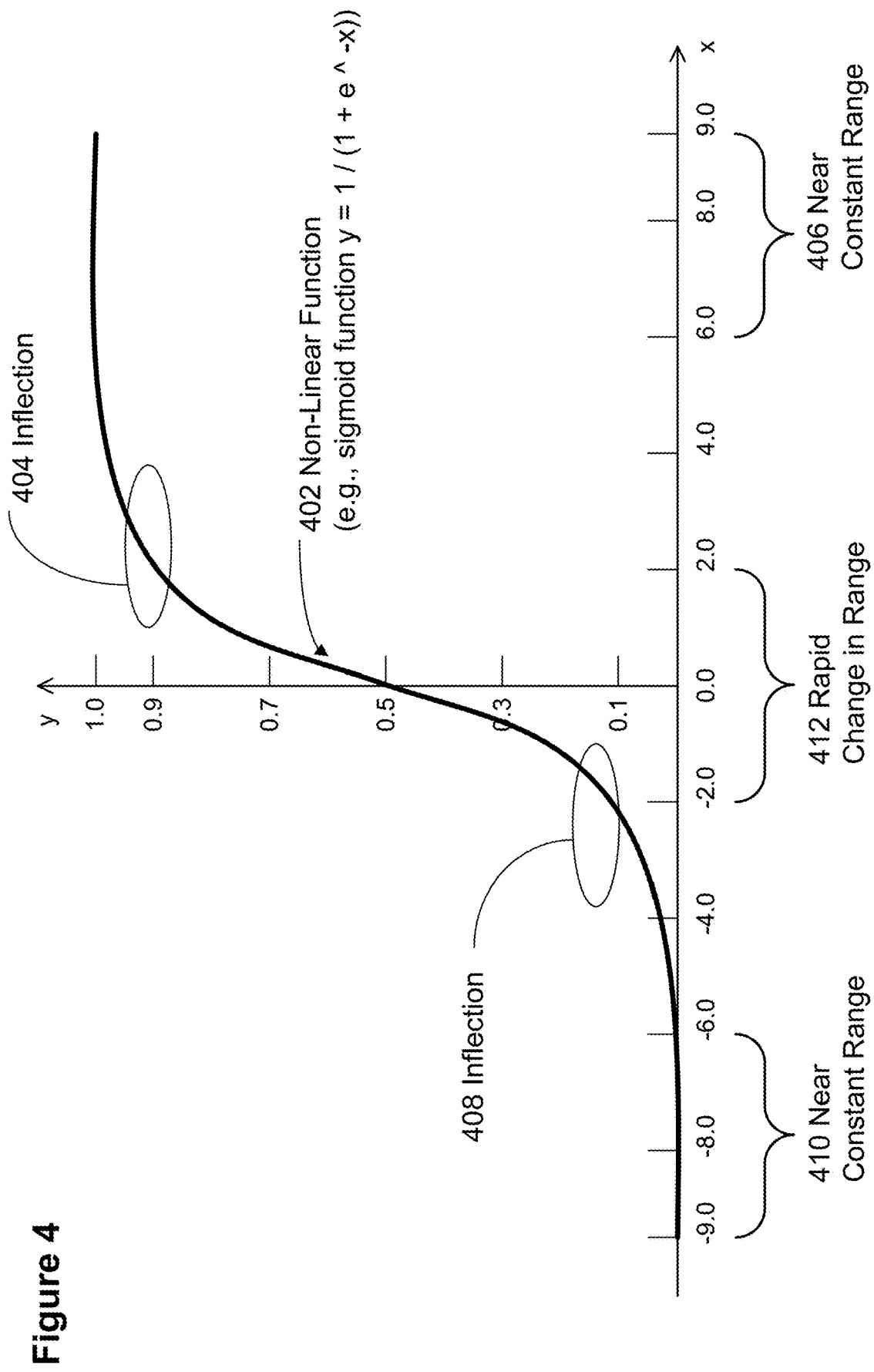
FIG. 4 illustrates a graph of a non-linear function, according to some implementations.

FIG. 4 illustrates a graph of a non-linear function 402 (shown as a dark line; e.g., sigmoid function). The graph is provided as an example for optimizing the organization of the look-up tables 214 and 218, according to some implementations. In the example shown, the X-axis corresponds to the input values, and the Y-axis corresponds to the output values of function 402. As can be seen, the input includes floating-point numbers between −9.0 and 9.0, and the output includes floating-point values between 0.0 and 1.0. As the graph indicates, for input values between −9.0 and −6.0, and between 2.0 and 9.0, function 402 produces near constant output value (0.0 and 1.0, respectively). For input values between −6.0 and −2.0, function 402 produces gradually increasing output values (between 0.0 and 0.1), and the trend continues until region 408 (inflection region). Between inflection regions 408 and 404, function 402 produces rapidly increasing output values (between 0.1 and 0.9). Beyond inflection region 404, and before input values reach 6.0, function 402 produces a gradually increasing output value (between 0.9 and 1.0). Based on this observation, in some implementations, the number of entries corresponding to input floating-point values between −2.0 and 2.0 in look-up tables 214 and 218 is much greater than the number of entries corresponding to input floating-point values between −6.0 and −2.0 or 2.0 and 6.0. In some implementations, look-up tables 214 and 218 are configured to store just one entry (corresponding to the output value 0.0) for input floating-point values between −9.0 and −6.0, and another entry (corresponding to the output value 1.0) for input floating-point values between 6.0 and 9.0. In this way, the look-up tables 214 and 218 can be programmed for different non-linear functions and/or for different ranges of floating-point numbers.

First Computation Module

Figure 5A:
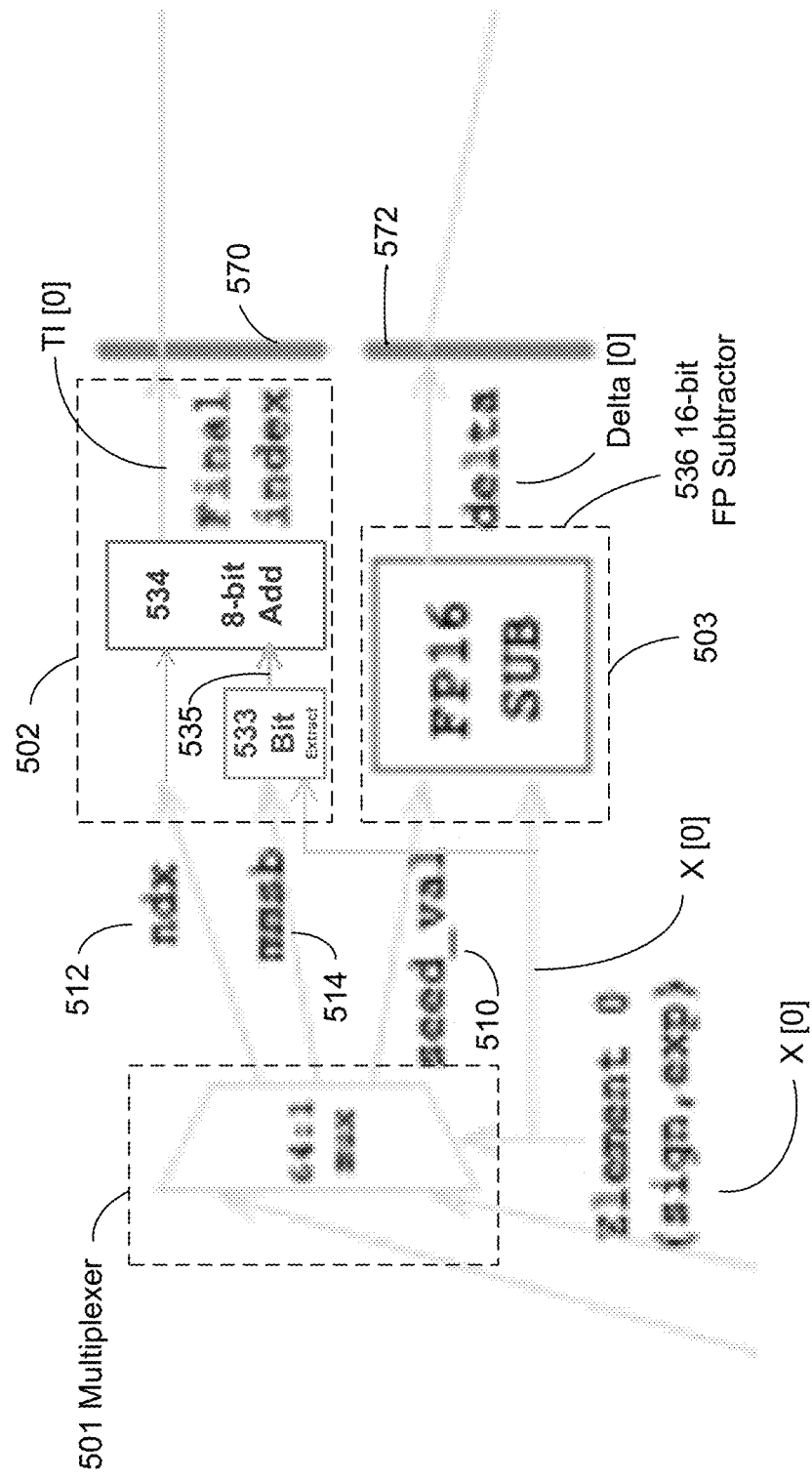
FIG. 5A illustrates a computation circuit of a first computation module in a circuit for calculating a non-linear function of floating-point numbers, according to some implementations.

As described above, in some implementations, the first computation module 212 includes a first plurality of computation circuits 212-0, ..., 212-N. FIG. 5A is an illustration of a computation circuit (e.g., computation circuit 212-0) of the first computation module 212, according to some implementations. As described above in reference to FIG. 3A, each floating-point number 202 received by the first computation module 212 is represented using a sign-bit, one or more exponent bits, and one or more fraction bits, according to some implementations. In some implementations, each computation circuit 212 (e.g., computation circuit 212-0) includes a first sub-circuit 501 configured to select the first entry from the first look-up table 214 based on the sign bit and the one or more exponent bits of an input floating-point number (e.g., floating-point number X [0]). In some implementations, each floating-point number received by the first computation module 212 is a half-precision binary floating-point number with 1 sign bit and 5 exponent bits, the first look-up table has 64 entries, and the first sub-circuit 501 can be a multiplexer configured to select the first entry from the first look-up table based on the sign bit and the one or more exponent bits of the input floating-point number. For example, in FIG. 5A, computation circuit 212-0 includes a multiplexer 501 that receives as inputs entries 0, ..., 63 from the first lookup table 214 and selects an entry from the first (index) look-up table 214 based on an input floating-point number (e.g., floating-point number X [0]). As described above in reference to FIG. 3A, each floating-point number received by the first computation module is represented using a sign-bit 302, one or more exponent bits 304, and one or more fraction bits 306. In the example shown in FIG. 5A, multiplexer 502 is a 64:1 mux that selects an entry (e.g., entry 314-$i$, i=0, ..., 63) from 64 entries of the first look-up table 214 based on the sign (e.g., sign bit 302) and exponent bits (e.g., exp 304) of the input floating-point number (e.g., X [0], shown in FIG. 5A as Element 0).

As described above in reference to FIG. 3B, the entry selected by the first subcircuit 501 (e.g., entry 314-$i$, i=0, ..., 63) includes a base index 512 (shown in FIG. 5A as ndx), a number of most significant bits 514 (shown in FIG. 5A as mnsb), and a seed value 510 (shown in FIG. 5A as seed_val), according to some implementations. In some implementations, as shown in FIG. 5A, each computation circuit 212 (e.g., computation circuit 212-0) includes a second sub-circuit 502 configured to receive the entry selected by the first sub-circuit 501 (e.g., entry (e.g., entry 314-$i$, i=0, ..., 63), to calculate the table index (e.g., TI [0], shown in FIG. 5A as Final index)) and the difference value (e.g., delta [0], shown in FIG. 5A as delta) corresponding to the input floating-point number (e.g., X [0]).

In some implementations, the second sub-circuit 502 includes a bit extractor circuit 533 to extract one or more significant bits (e.g., bits 535) from the one or more fraction bits, and an adder circuit 534 configured to add the base index 512 in the selected entry and the one or more significant bits to calculate the corresponding table index (e.g., TI [0]).

In some implementations, the base index and the one or more significant bits extracted are each 8-bits long, the adder circuit is an 8-bit integer adder, the table index is an 8-bit value, and the second computation module is further configured to index the second look-up table using the 8-bit table index as the key. For example, in FIG. 5A, an 8-bit adder 534 (8$b$ ADD) adds index 512 and the one or more significant bits 535 to output a final (table) index (e.g., TI [0]) that is used by the second computation module 216 to index the second look-up table 218.

In some implementations, the first computation module 212 also includes a third sub-circuit 503 configured to receive the selected entry (e.g., entry 314-$i$, i=0, ..., 63) and the input floating point number (e.g., X [0]), and to extract and use the seed value (e.g., seed_val 308) in the selected entry to calculate the difference value (e.g., delta [0]) for the input floating-point number. For example, in FIG. 5A, a 16-bit floating-point subtractor 536 (FP16 SUB) subtracts a seed value (seed_val 510) from an input floating-point number 202-0 to calculate a difference value 210-0 used by the second computation module 216. In some implementations, the third sub-circuit is further configured to calculate the difference value based on the mantissa or the fraction bits in the input (e.g., input 202-0) and that of the seed value.

In some implementations, the first sub-circuit (e.g., multiplexer 501) of the first computation module 212 is further configured to extract from the selected entry and output an index value (e.g., ndx 512) and the number of most significant bits (e.g., nmsb 514), and the second sub-circuit is further configured to receive the index and the number of most significant bits output by the first sub-circuit. In some implementations, the first sub-circuit is further configured to extract from the selected entry and output a seed value (e.g., seed_val 510), and the second sub-circuit is further configured to receive the seed value output by the first sub-circuit.

In some implementations, the first computation module 212 includes one or more memory elements (e.g., latches 570, 572) to interface with the second computation module 216. For example, in FIG. 5A, element 570 latches the final index TI [0] output by the 8-bit adder 534, and element 572 latches the difference value delta [0] output by the 16-bit subtractor 536.

Second Computation Module

Figure 5B:
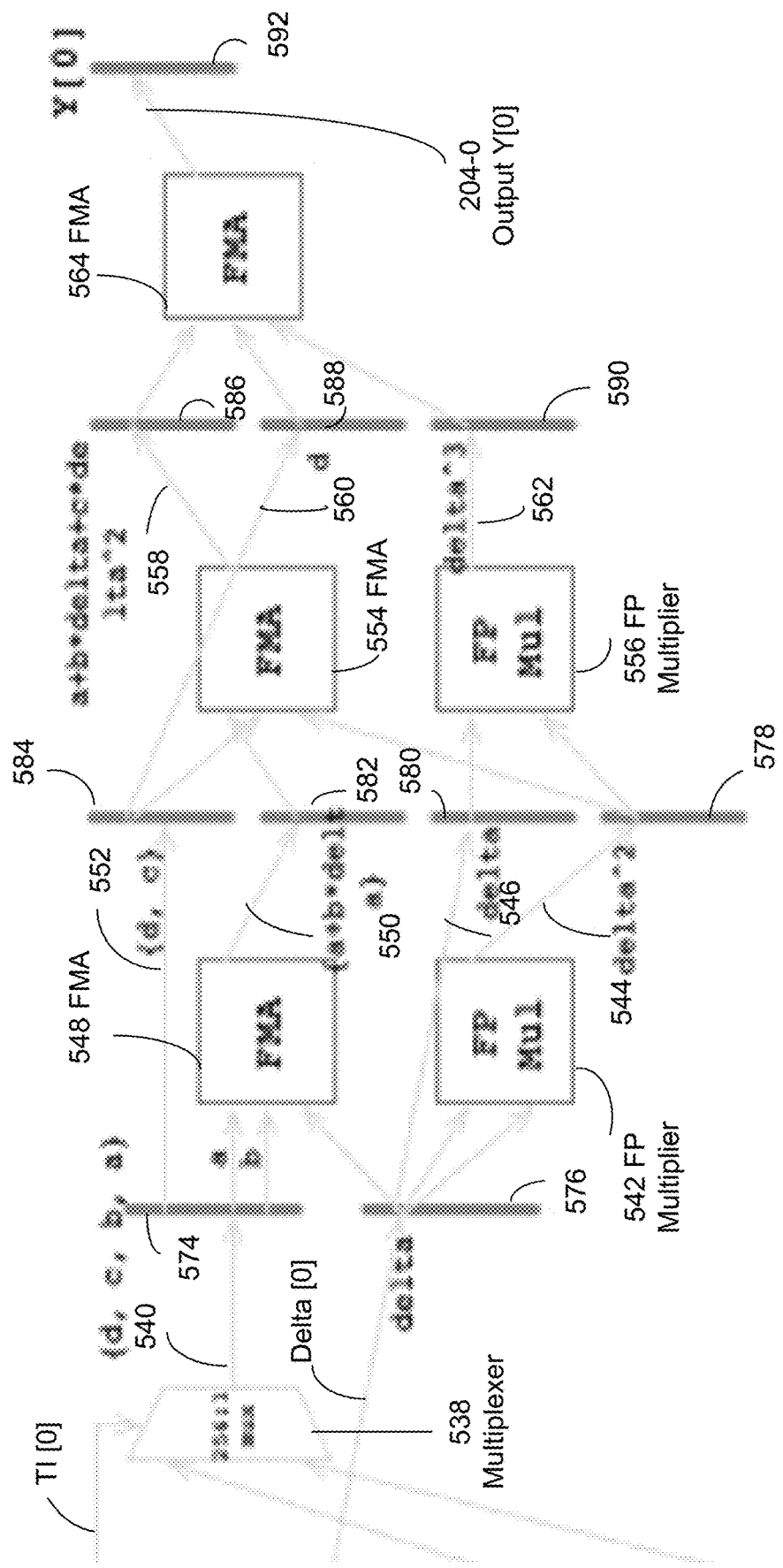
FIG. 5B illustrates a computation circuit of a second computation module in a circuit for calculating a non-linear function of floating-point numbers, according to some implementations.

As described above, in some implementations, the second computation module 216 includes a second plurality of computation circuits 216-0, ..., 216-N. FIG. 5B is an illustration of a computation circuit 216-0 of the second computation module 216, according to some implementations. As described above in reference to FIG. 5A, computation circuit 216-0 uses the table index TI [0] output by the first computation module 212 to index the second look-up table 218 and selects an entry (e.g., entry 324-$j$, j=0, ..., 255) from the second look-up table 218, according to some implementations. For example, in FIG. 5B, the table index TI [0] output by the first computation module is an 8-bit value, the second look-up table 218 has 256 entries, and computation circuit 216-0 includes a multiplexer 538 configured to receive the 256 entries (i.e., entries 324-0, ..., 324-255) from the second lookup table 218 and to select an entry 540 (e.g., entry 324-$j$, j=0, ..., 255) from the 256 entries by indexing the second look-up table 218 using the 8-bit table index (e.g., TI [0]), according to some implementations.

As described above in reference to FIG. 3C, each entry of the second plurality of entries 324 of the second look-up table 218 includes a plurality of coefficient values, according to some implementations. In some implementations, the second computation module 216 is further configured to calculate the approximate value using the plurality of coefficient values included in the second entry.

In some implementations, the second computation module 216 includes one or more sub-circuits configured to receive the plurality of coefficient values and calculate the approximate value using polynomial approximation. In some implementations, the one or more sub-circuits form a second computation pipeline to progressively compute the approximate value.

For example, as shown in FIG. 5B, the plurality of coefficient values (e.g., co-efficient values 540 in the entry selected by multiplexer 538) includes at least 4 co-efficient values a, b, c, and d. The one or more sub-circuits includes a first floating-point multiply adder circuit (e.g., FMA 548) in a first stage of the second computation pipeline configured to receive a and b, and delta 210 (the difference value output by the first computation module), and calculate and output a first intermediate component 550 of the approximate value based on a, b and delta. The one or more sub-circuits also includes a first floating-point multiplier circuit (e.g., FP Mul 542) in the first stage of the second computation pipeline configured to receive delta, and calculate and output a second intermediate component 544 of the approximate value based on delta. The one or more sub-circuits further includes a second floating-point multiply adder circuit 554 in a second stage of the second computation pipeline configured to receive c and the first intermediate component 550, and calculate and output a third intermediate component 558 of the approximate value based on c and the first intermediate component. The one or more sub-circuits also includes a second floating-point multiplier circuit 556 configured in the second stage of the second computation pipeline configured to receive delta and the second intermediate component 544, and calculate and output a fourth intermediate component 562 of the approximate value based on delta and the second intermediate component 544. The one or more sub-circuits also includes a third floating-point multiply adder circuit 564 in a third stage of the second computation pipeline configured to receive d, the third intermediate component 558, and the fourth intermediate component 562, and calculate and output the approximate value based on d, the third intermediate component 558 and the fourth intermediate component 562.

In some implementations, the second computation module 216 includes one or more memory elements (e.g., latches 574, 576) to interface between the different stages of the second computation pipeline. For example, in FIG. 5B, for the first pipeline stage, element 574 latches the co-efficient values 540 (a, b, c, and d) output by the multiplexer 538, and element 576 latches the difference value output 210 (delta) by the first computation module 212. For the second pipeline stage, element 584 latches d and c, element 582 latches 550 (the value of a+b*delta), element 580 latches 546 (the value of delta), and element 578 latches 544 (the value of delta^2). For the third pipeline stage, element 586 latches 558 (the value of a+b*delta+c*delta^2), element 588 latches 560 (the value of d), and element 590 latches 562 (the value of delta^3). And, for the final pipeline or output stage, element 592 latches output 204-0 of the second computation pipeline.

Example Circuit for Calculating Non-Linear Functions for Floating-Point Numbers

Figure 5C:
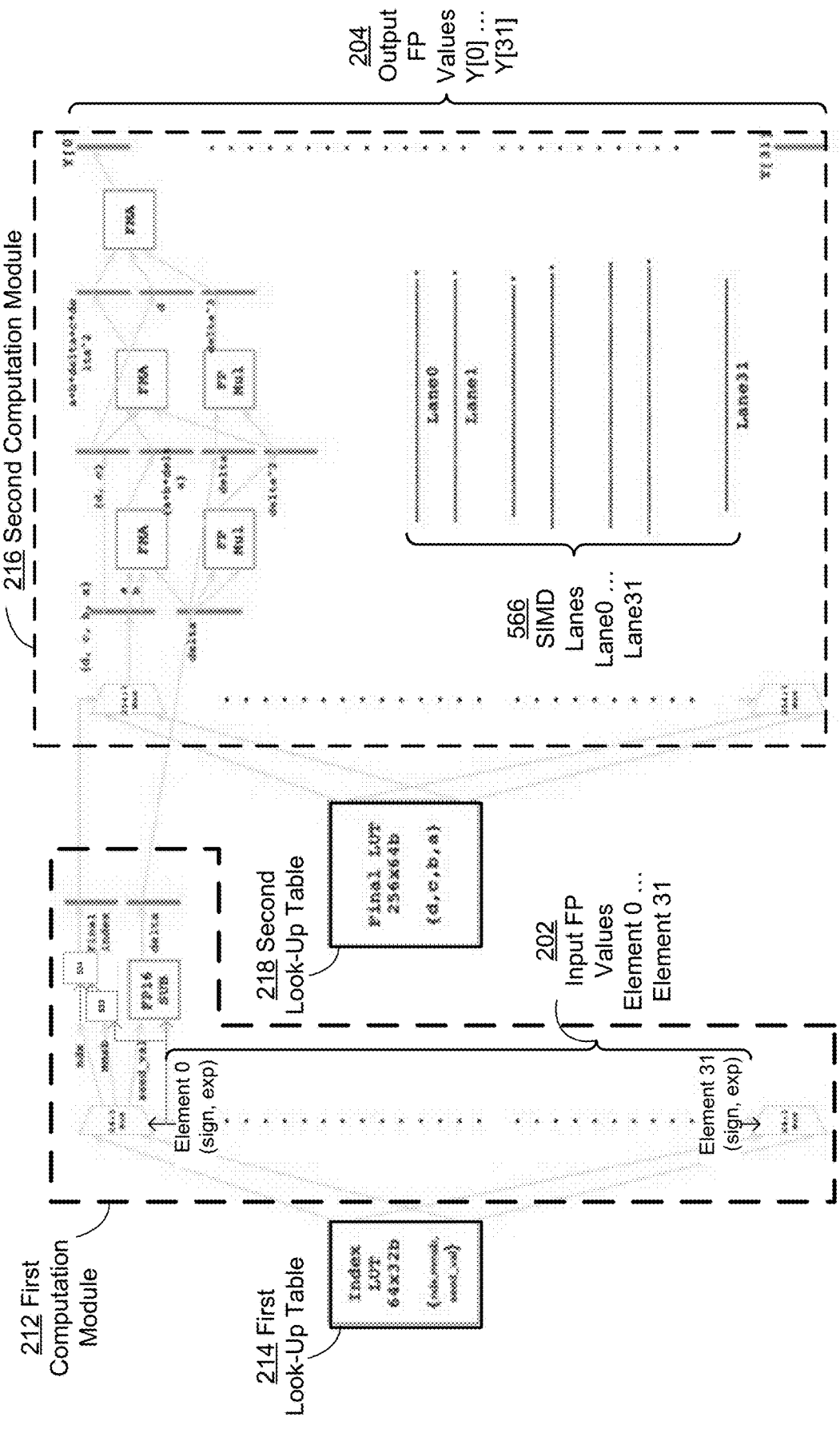
FIG. 5C is a block diagram illustrating a circuit for calculating non-linear functions of floating-point numbers, according to some implementations.

FIG. 5C is a block diagram illustrating an example circuit 200, according to some implementations. FIG. 5C is based on the building blocks of FIG. 5A (for the first computation module 212) and FIG. 5B (for the second computation module 216). FIG. 5C also illustrates the first look-up table 214, the second look-up table 218, and the interfaces between the look-up tables and modules 212 and 216. The first computation module 212 includes computation circuits 212-0, ..., 212-31 (each computation circuit as in FIG. 5A). Each computation circuit of the first computation module 212 receives a respective input floating-point number, selects an entry from the first look-up table 214 corresponding to the respective input floating-point number, and calculates and outputs a respective final index and delta value that are used by the second computation module 216. In the example shown, the input floating-point values include Elements 0 through Element 31, and each value is input to a respective computation sub-circuit of the first computation module 212. The first computation module 212 produces 32 different sets of final index and delta values every clock cycle, according to some implementations.

Further, the second computation module includes computation circuits 216-0, ..., 216-31 (each computation circuit as in FIG. 5B), according to some implementations. Each computation circuit of the second computation module 216 is paired with a respective computation circuit of the first computation module 212. For example, in FIG. 5C, circuit 216-0 of the second computation module 216 is paired (i.e., interfaces) with circuit 212-0 of the first computation module 212, according to some implementations. Each computation circuit of the second computation module 216 selects an entry from the second look-up table 218 based on the respective final (table) index output (or latched) by a corresponding circuit of the first computation module 212, and calculates and outputs a respective approximate value. The second computation module 212 produces 32 different approximate values every calculation cycle, according to some implementations. Thus, circuit 200 as a whole produces 32 different approximate values corresponding to the 32 different input floating-point numbers (Elements 0, ..., 31) concurrently (indicated by the lanes Lane 0 ..., Lane 31 (SIMD Lanes 566), according to some implementations.

In various implementations, the modules 212 and 216, and look-up tables 214 and 218 can be configured depending on the non-linear function, the level of accuracy required for calculating the non-linear function, and/or the input floating-point numbers. For example, if the non-linear function requires only limited accuracy, the second look-up table can be organized to store fewer co-efficient values or fewer entries, or the second computation pipeline can be shortened for improved latency.

Method for Calculating a Non-Linear Function of Floating-Point Numbers

Figure 6A:
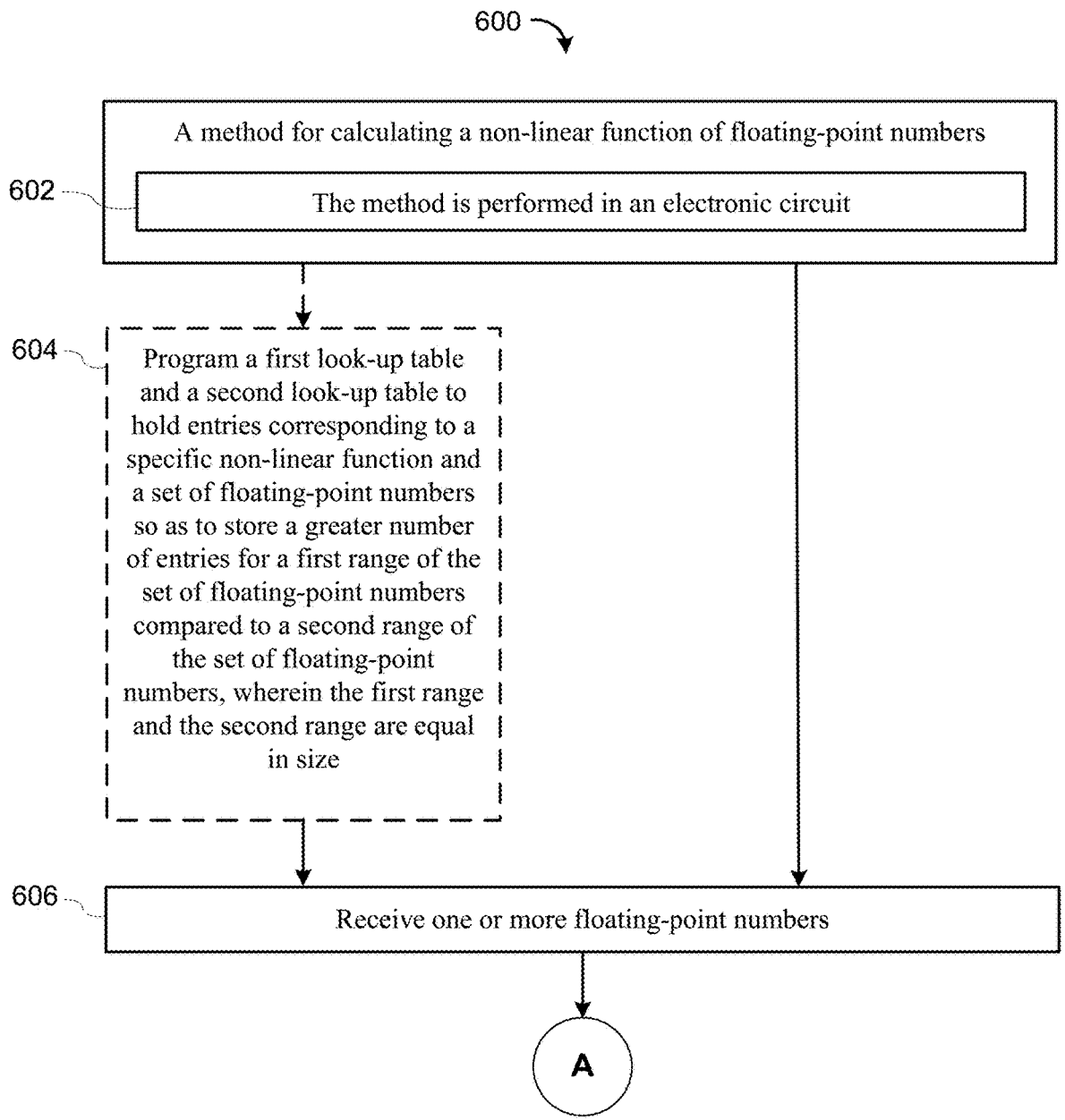
FIGS. 6A and 6B illustrate a flowchart representation of a circuit-implemented method for calculating a non-linear function of floating-point numbers, according to some implementations.
Figure 6B:
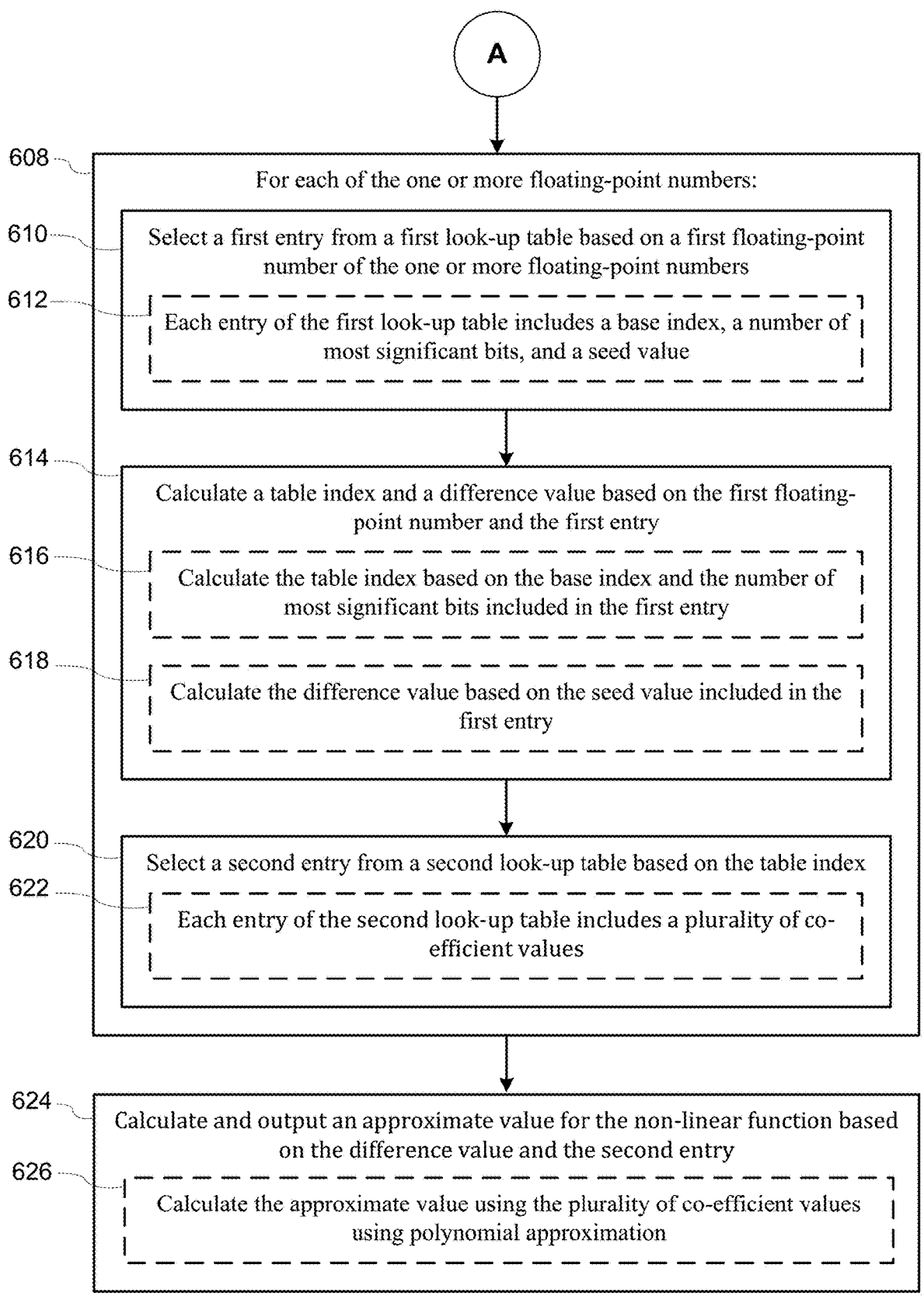

FIGS. 6A and 6B illustrate a flowchart representation of a computer-implemented method 600 for calculating a non-linear function (e.g., non-linear function 402) of floating-point numbers, according to some implementations. The method is performed (602) in an electronic circuit (e.g., circuit 200), according to some implementations.

The method includes receiving (606) one or more floating-point numbers (e.g., input 202), and for each (608) of the one or more floating-point numbers: selecting (610) a first entry from a first look-up table (e.g., entry 214-0 of first look-up table 214) based on a first floating-point number of the one or more floating-point numbers; calculating (614) a table index (e.g., table index 208) and a difference value (e.g., difference value 210) based on the first floating-point number and the first entry; selecting (620) a second entry from a second look-up table (e.g., entry 218-0 of second look-up table 218) based on the table index; and calculating and outputting (624) an approximate value (e.g., output 204) for the non-linear function based on the difference value and the second entry.

In some implementations, as described above in reference to FIG. 3B, each entry of the first look-up table includes (612) a base index (e.g., index 310), a number of most significant bits (e.g., nmsb 312), and a seed value (e.g., seed_val 308), and the method calculates (616) the table index (e.g., as described above in reference to FIG. 5A) based on the base index and the number of most significant bits included in the first entry; and calculates (618) the difference value (e.g., as described above in reference to FIG. 5A) based on the seed value included in the first entry.

In some implementations, as described above in reference to FIG. 3C, each entry (622) of the second look-up table includes a plurality of co-efficient values (e.g., coefficient values a, b, c, and d of entry 324-0 of table 218), and the method calculates (626) the approximate value (e.g., as described above in reference to FIG. 5B) using the plurality of co-efficient values using polynomial approximation.

In some implementations, the method further comprises programming (604) a first look-up table and a second look-up table to hold entries corresponding to a specific non-linear function and a set of floating-point numbers. For example, supposing the first look-up table is programmed for calculating the non-linear function 1/x (i.e., the reciprocal of a floating-point number x). Then the lower half of each of the first look-up table entries is programmed with $2^{-(exponent-bias)}$ for every combination of {sign, exponent} bits. In some implementations, the method further comprises programming the look-up tables so as to store a greater number of entries for a first range of the set of floating-point numbers compared to a second range of the set of floating-point numbers, wherein the first range and the second range are equal in size. FIG. 4, discussed above, explains the motivation for optimizing the organization of the first and second look-up tables.

Tables I and II illustrate as an example a first look-up table (Index Look-up Table (LUT)) and a second look-up table (Main LUT) for the exponent function $e^x$ for a range of floating-point values of x, according to some implementations. Table I illustrates Index LUT entries. As described above in reference to FIGS. 3A, 3B, and 5A, the sign and exponent bits of an input floating-point number are used to index the first look-up table. In the example shown, columns A and B correspond to the sign and exponent values of possible FP16 (half-precision) numbers. The mantissa or the fraction bits are not shown in Table I because they are not used in the look-up of the Index LUT. As shown, there are 64 possible entries (entries 0 through 63 in column C) corresponding to the 1-bit of sign and 5 bits of exponent. Other implementations may index the first look-up table with a reverse order of the sign and exponent bits than shown in Table I. Columns D, E, and F show the values stored in the Index LUT for the 64 entries. Column D corresponds to the number of most significant bits of mantissa (shown as mantissa msb's used) to be used in the second look-up table index computation. Column E corresponds to the seed value (16-bit values) to be used in the polynomial approximation. Column F corresponds to the base index also used in the second look-up table index computation. Although not indicated, the number of bits allocated for the base index and/or the mantissa msb's used can vary between implementations subject to constraints. Each entry in the first look-up table is 32 bits long, so the base index and the mantissa msb bits (number of most significant bits to be used from the mantissa bits of the floating-point number) can occupy the remaining 16 bits. If the second look-up table has 256 entries, the base index is limited to 8 bits ($2^8=256$). As the table illustrates, a large number of entries are clustered around base indices 143 and 0. This is a reflection of the number of entries that is required to plot or approximate the exponent function, given the size constraints of the main look-up table (shown in the second spreadsheet). As described above in reference to FIG. 4, some input floating-point values produce a large variation in the output values for the non-linear function that the look-up tables correspond to. So a larger number of table entries are allocated for those ranges of input floating-point numbers than others.

Table II illustrates the second look-up table (Main Look-up Table (Main LUT)) for the exponent function. Column A corresponds to the input floating-point number. The table entries (i.e., coefficient values) are calculated offline (e.g., using software programs, such as MATLAB polyfit), so the column indicates the values generated for a desired set of input floating-point numbers. Columns B, C, and D correspond to the sign, exponent, and mantissa bits, respectively, for the floating-point input numbers in Column A. Columns E, F, G, and H correspond to the co-efficient values (a, b, c, and d) used for the polynomial approximation (of the exponent function). The example illustrated uses Taylor series expansion, but the tables (and the co-efficient values) can be programmed for a variety of polynomials, or approximation algorithms. Table III lists intermediate, theoretical, and final results (of the non-linear function) computed for the respective input floating-point numbers using the Taylor series approximation based on the respective co-efficient values. An offline software program can use these values to adjust the number of entries, the values of the entries, to limit approximation errors.

The first look-up table has a limited set of entries (64 entries in the example shown). Whereas, the second look-up table has a comparatively larger set of entries (programmable based on the set of bits available for addressing). With 8-bit base indices (returned from the Index LUT look-up), however, at most 64 possible entries of the second look-up table are addressable. A set of the mantissa bits of the input floating-point number is extracted (based on the mantissa msb's used; column D in Table I; nmsb in the first look-up table). The extracted set of bits is used as an offset to the base index value thereby computing a dynamic range of index values (i.e., values 0, . . . , 256, depending on the input floating-point number). In the example shown, not all the possible 256 entries of the Main LUT are used. The number of values in each table, as are the values themselves, are software programmable, depending on the non-linear function and for different software applications. For example, if benchmarking of a high-level application indicates some ranges of input floating-point input values are more important than others, then more entries are allocated for those input floating-point numbers. In this way, the hierarchical look-up tables (i.e., the Index LUT and the Main LUT) are programmable for various non-linear functions and for various floating-point values.

TABLE I

| | FP16 | | Index LUT entries | | |
| --- | --- | --- | --- | --- | --- |
| | | | Column | | Column |
| Column A Sign | Column B Exponent | Column C Entries | D Mantissa msb's used | Column E Seed value on FP16 | F Index in Main LUT |
| 0 | 00000 | 0 | 0 | 0_00000_0000000000 | 143 |
| 0 | 00001 | 1 | 0 | 0_00000_0000000000 | 143 |
| 0 | 00010 | 2 | 0 | 0_00000_0000000000 | 143 |
| 0 | 00011 | 3 | 0 | 0_00000_0000000000 | 143 |
| 0 | 00100 | 4 | 0 | 0_00000_0000000000 | 143 |
| 0 | 00101 | 5 | 0 | 0_00000_0000000000 | 143 |
| 0 | 00110 | 6 | 0 | 0_00000_0000000000 | 143 |

TABLE I-continued

| FP16 | | | Index LUT entries | | |
|---|---|---|---|---|---|
| Column A Sign | Column B Exponent | Column C Entries | Column D Mantissa msb's used | Column E Seed value on FP16 | Column F Index in Main LUT |
| 0 | 00111 | 7 | 0 | 0_00000_0000000000 | 143 |
| 0 | 01000 | 8 | 0 | 0_00000_0000000000 | 143 |
| 0 | 01001 | 9 | 0 | 0_00000_0000000000 | 143 |
| 0 | 01010 | 10 | 0 | 0_00000_0000000000 | 143 |
| 0 | 01011 | 11 | 0 | 0_00000_0000000000 | 143 |
| 0 | 01100 | 12 | 0 | 0_01100_0000000000 | 144 |
| 0 | 01101 | 13 | 1 | 0_01101_0000000000 | 145 |
| 0 | 01110 | 14 | 2 | 0_01110_0000000000 | 147 |
| 0 | 01111 | 15 | 3 | 0_01111_0000000000 | 151 |
| 0 | 10000 | 16 | 4 | 0_10000_0000000000 | 159 |
| 0 | 10001 | 17 | 5 | 0_10001_0000000000 | 175 |
| 0 | 10010 | 18 | 5 | 0_10010_0000000000 | 207 |
| 0 | 10011 | 19 | 0 | 0_00000_0000000000 | 0 |
| 0 | 10100 | 20 | 0 | 0_00000_0000000000 | 0 |
| 0 | 10101 | 21 | 0 | 0_00000_0000000000 | 0 |
| 0 | 10110 | 22 | 0 | 0_00000_0000000000 | 0 |
| 0 | 10111 | 23 | 0 | 0_00000_0000000000 | 0 |
| 0 | 11000 | 24 | 0 | 0_00000_0000000000 | 0 |
| 0 | 11001 | 25 | 0 | 0_00000_0000000000 | 0 |
| 0 | 11010 | 26 | 0 | 0_00000_0000000000 | 0 |
| 0 | 11011 | 27 | 0 | 0_00000_0000000000 | 0 |
| 0 | 11100 | 28 | 0 | 0_00000_0000000000 | 0 |
| 0 | 11101 | 29 | 0 | 0_00000_0000000000 | 0 |
| 0 | 11110 | 30 | 0 | 0_00000_0000000000 | 0 |
| 0 | 11111 | 31 | 0 | 0_00000_0000000000 | 0 |
| 1 | 00000 | 32 | 0 | 0_00000_0000000000 | 0 |
| 1 | 00001 | 33 | 0 | 0_00000_0000000000 | 0 |
| 1 | 00010 | 34 | 0 | 0_00000_0000000000 | 0 |
| 1 | 00011 | 35 | 0 | 0_00000_0000000000 | 0 |
| 1 | 00100 | 36 | 0 | 0_00000_0000000000 | 0 |
| 1 | 00101 | 37 | 0 | 0_00000_0000000000 | 0 |
| 1 | 00110 | 38 | 0 | 0_00000_0000000000 | 0 |
| 1 | 00111 | 39 | 0 | 0_00000_0000000000 | 0 |
| 1 | 01000 | 40 | 0 | 0_00000_0000000000 | 0 |
| 1 | 01001 | 41 | 0 | 0_00000_0000000000 | 0 |
| 1 | 01010 | 42 | 0 | 0_00000_0000000000 | 0 |
| 1 | 01011 | 43 | 0 | 0_00000_0000000000 | 0 |
| 1 | 01100 | 44 | 0 | 1_01100_0000000000 | 142 |
| 1 | 01101 | 45 | 1 | 1_01101_0000000000 | 140 |
| 1 | 01110 | 46 | 2 | 1_01110_0000000000 | 136 |
| 1 | 01111 | 47 | 3 | 1_01111_0000000000 | 128 |
| 1 | 10000 | 48 | 4 | 1_10000_0000000000 | 112 |
| 1 | 10001 | 49 | 5 | 1_10001_0000000000 | 80 |
| 1 | 10010 | 50 | 6 | 1_10010_0000000000 | 16 |
| 1 | 10011 | 51 | 4 | 1_10011_0000000000 | 0 |
| 1 | 10100 | 52 | 0 | 0_00000_0000000000 | 0 |
| 1 | 10101 | 53 | 0 | 0_00000_0000000000 | 0 |
| 1 | 10110 | 54 | 0 | 0_00000_0000000000 | 0 |
| 1 | 10111 | 55 | 0 | 0_00000_0000000000 | 0 |
| 1 | 11000 | 56 | 0 | 0_00000_0000000000 | 0 |
| 1 | 11001 | 57 | 0 | 0_00000_0000000000 | 0 |
| 1 | 11010 | 58 | 0 | 0_00000_0000000000 | 0 |
| 1 | 11011 | 59 | 0 | 0_00000_0000000000 | 0 |
| 1 | 11100 | 60 | 0 | 0_00000_0000000000 | 0 |
| 1 | 11101 | 61 | 0 | 0_00000_0000000000 | 0 |
| 1 | 11110 | 62 | 0 | 0_00000_0000000000 | 0 |
| 1 | 11111 | 63 | 0 | 0_00000_0000000000 | 0 |

TABLE II

| Floating-Point Number (16-bit format) | | | | Main LUT Entries | | | |
|---|---|---|---|---|---|---|---|
| Column A Value | Col. B Sign | Column C exp | Column D Mantissa | Column E a | Column F b | Column G c | Column H d |
| −31 | 1 | 10011 | 1111000000 | 3.44E−14 | 3.44E−14 | 1.72E−14 | 5.74E−15 |
| −30 | 1 | 10011 | 1110000000 | 9.36E−14 | 9.36E−14 | 4.68E−14 | 1.56E−14 |
| −29 | 1 | 10011 | 1101000000 | 2.54E−13 | 2.54E−13 | 1.27E−13 | 4.24E−14 |
| −28 | 1 | 10011 | 1100000000 | 6.91E−13 | 6.91E−13 | 3.46E−13 | 1.15E−13 |
| −27 | 1 | 10011 | 1011000000 | 1.88E−12 | 1.88E−12 | 9.4E−13 | 3.13E−13 |
| −26 | 1 | 10011 | 1010000000 | 5.11E−12 | 5.11E−12 | 2.55E−12 | 8.52E−13 |
| −25 | 1 | 10011 | 1001000000 | 1.39E−11 | 1.39E−11 | 6.94E−12 | 2.31E−12 |
| −24 | 1 | 10011 | 1000000000 | 3.78E−11 | 3.78E−11 | 1.89E−11 | 6.29E−12 |
| −23 | 1 | 10011 | 0111000000 | 1.03E−10 | 1.03E−10 | 5.13E−11 | 1.71E−11 |
| −22 | 1 | 10011 | 0110000000 | 2.79E−10 | 2.79E−10 | 1.39E−10 | 4.65E−11 |
| −21 | 1 | 10011 | 0101000000 | 7.58E−10 | 7.58E−10 | 3.79E−10 | 1.26E−10 |
| −20 | 1 | 10011 | 0100000000 | 2.06E−09 | 2.06E−09 | 1.03E−09 | 3.44E−10 |
| −19 | 1 | 10011 | 0011000000 | 5.6E−09 | 5.6E−09 | 2.8E−09 | 9.34E−10 |
| −18 | 1 | 10011 | 0010000000 | 1.52E−08 | 1.52E−08 | 7.61E−09 | 2.54E−09 |
| −17 | 1 | 10011 | 0001000000 | 4.14E−08 | 4.14E−08 | 2.07E−08 | 6.9E−09 |
| −16 | 1 | 10011 | 0000000000 | 1.13E−07 | 1.13E−07 | 5.63E−08 | 1.88E−08 |
| −15.875 | 1 | 10010 | 1111110000 | 1.28E−07 | 1.28E−07 | 6.38E−08 | 2.13E−08 |
| −15.75 | 1 | 10010 | 1111100000 | 1.44E−07 | 1.44E−07 | 7.22E−08 | 2.41E−08 |
| −15.625 | 1 | 10010 | 1111010000 | 1.64E−07 | 1.64E−07 | 8.19E−08 | 2.73E−08 |
| −15.5 | 1 | 10010 | 1111000000 | 1.86E−07 | 1.86E−07 | 9.28E−08 | 3.09E−08 |
| −15.375 | 1 | 10010 | 1110110000 | 2.1E−07 | 2.1E−07 | 1.05E−07 | 3.5E−08 |
| −15.25 | 1 | 10010 | 1110100000 | 2.38E−07 | 2.38E−07 | 1.19E−07 | 3.97E−08 |
| −15.125 | 1 | 10010 | 1110010000 | 2.7E−07 | 2.7E−07 | 1.35E−07 | 4.5E−08 |
| −15 | 1 | 10010 | 1110000000 | 3.06E−07 | 3.06E−07 | 1.53E−07 | 5.1E−08 |
| −14.875 | 1 | 10010 | 1101110000 | 3.47E−07 | 3.47E−07 | 1.73E−07 | 5.78E−08 |
| −14.75 | 1 | 10010 | 1101100000 | 3.93E−07 | 3.93E−07 | 1.96E−07 | 6.55E−08 |
| −14.625 | 1 | 10010 | 1101010000 | 4.45E−07 | 4.45E−07 | 2.23E−07 | 7.42E−08 |
| −14.5 | 1 | 10010 | 1101000000 | 5.04E−07 | 5.04E−07 | 2.52E−07 | 8.41E−08 |
| −14.375 | 1 | 10010 | 1100110000 | 5.72E−07 | 5.72E−07 | 2.86E−07 | 9.53E−08 |
| −14.25 | 1 | 10010 | 1100100000 | 6.48E−07 | 6.48E−07 | 3.24E−07 | 1.08E−07 |
| −14.125 | 1 | 10010 | 1100010000 | 7.34E−07 | 7.34E−07 | 3.67E−07 | 1.22E−07 |

TABLE II-continued

| Floating-Point Number (16-bit format) | | | | Main LUT Entries | | | |
|---|---|---|---|---|---|---|---|
| Column A Value | Col. B Sign | Column C exp | Column D Mantissa | Column E a | Column F b | Column G c | Column H d |
| −14 | 1 | 10010 | 1100000000 | 8.32E−07 | 8.32E−07 | 4.16E−07 | 1.39E−07 |
| −13.875 | 1 | 10010 | 1011110000 | 9.42E−07 | 9.42E−07 | 4.71E−07 | 1.57E−07 |
| −13.75 | 1 | 10010 | 1011100000 | 1.07E−06 | 1.07E−06 | 5.34E−07 | 1.78E−07 |
| −13.625 | 1 | 10010 | 1011010000 | 1.21E−06 | 1.21E−06 | 6.05E−07 | 2.02E−07 |
| −13.5 | 1 | 10010 | 1011000000 | 1.37E−06 | 1.37E−06 | 6.85E−07 | 2.28E−07 |
| −13.375 | 1 | 10010 | 1010110000 | 1.55E−06 | 1.55E−06 | 7.77E−07 | 2.59E−07 |
| −13.25 | 1 | 10010 | 1010100000 | 1.76E−06 | 1.76E−06 | 8.8E−07 | 2.93E−07 |
| −13.125 | 1 | 10010 | 1010010000 | 1.99E−06 | 1.99E−06 | 9.97E−07 | 3.32E−07 |
| −13 | 1 | 10010 | 1010000000 | 2.26E−06 | 2.26E−06 | 1.13E−06 | 3.77E−07 |
| −12.875 | 1 | 10010 | 1001110000 | 2.56E−06 | 2.56E−06 | 1.28E−06 | 4.27E−07 |
| −12.75 | 1 | 10010 | 1001100000 | 2.9E−06 | 2.9E−06 | 1.45E−06 | 4.84E−07 |
| −12.625 | 1 | 10010 | 1001010000 | 3.29E−06 | 3.29E−06 | 1.64E−06 | 5.48E−07 |
| −12.5 | 1 | 10010 | 1001000000 | 3.73E−06 | 3.73E−06 | 1.86E−06 | 6.21E−07 |
| −12.375 | 1 | 10010 | 1000110000 | 4.22E−06 | 4.22E−06 | 2.11E−06 | 7.04E−07 |
| −12.25 | 1 | 10010 | 1000100000 | 4.79E−06 | 4.79E−06 | 2.39E−06 | 7.98E−07 |
| −12.125 | 1 | 10010 | 1000010000 | 5.42E−06 | 5.42E−06 | 2.71E−06 | 9.04E−07 |
| −12 | 1 | 10010 | 1000000000 | 6.14E−06 | 6.14E−06 | 3.07E−06 | 1.02E−06 |
| −11.875 | 1 | 10010 | 0111110000 | 6.96E−06 | 6.96E−06 | 3.48E−06 | 1.16E−06 |
| −11.75 | 1 | 10010 | 0111100000 | 7.89E−06 | 7.89E−06 | 3.94E−06 | 1.31E−06 |
| −11.625 | 1 | 10010 | 0111010000 | 8.94E−06 | 8.94E−06 | 4.47E−06 | 1.49E−06 |
| −11.5 | 1 | 10010 | 0111000000 | 1.01E−05 | 1.01E−05 | 5.07E−06 | 1.69E−06 |
| −11.375 | 1 | 10010 | 0110110000 | 1.15E−05 | 1.15E−05 | 5.74E−06 | 1.91E−06 |
| −11.25 | 1 | 10010 | 0110100000 | 1.3E−05 | 1.3E−05 | 6.5E−06 | 2.17E−06 |
| −11.125 | 1 | 10010 | 0110010000 | 1.47E−05 | 1.47E−05 | 7.37E−06 | 2.46E−06 |
| −11 | 1 | 10010 | 0110000000 | 1.67E−05 | 1.67E−05 | 8.35E−06 | 2.78E−06 |
| −10.875 | 1 | 10010 | 0101110000 | 1.89E−05 | 1.89E−05 | 9.46E−06 | 3.15E−06 |
| −10.75 | 1 | 10010 | 0101100000 | 2.14E−05 | 2.14E−05 | 1.07E−05 | 3.57E−06 |
| −10.625 | 1 | 10010 | 0101010000 | 2.43E−05 | 2.43E−05 | 1.22E−05 | 4.05E−06 |
| −10.5 | 1 | 10010 | 0101000000 | 2.75E−05 | 2.75E−05 | 1.38E−05 | 4.59E−06 |
| −10.375 | 1 | 10010 | 0100110000 | 3.12E−05 | 3.12E−05 | 1.56E−05 | 5.2E−06 |
| −10.25 | 1 | 10010 | 0100100000 | 3.54E−05 | 3.54E−05 | 1.77E−05 | 5.89E−06 |
| −10.125 | 1 | 10010 | 0100010000 | 4.01E−05 | 4.01E−05 | 2E−05 | 6.68E−06 |
| −10 | 1 | 10010 | 0100000000 | 4.54E−05 | 4.54E−05 | 2.27E−05 | 7.57E−06 |
| −9.875 | 1 | 10010 | 0011110000 | 5.14E−05 | 5.14E−05 | 2.57E−05 | 8.57E−06 |
| −9.75 | 1 | 10010 | 0011100000 | 5.83E−05 | 5.83E−05 | 2.91E−05 | 9.72E−06 |
| −9.625 | 1 | 10010 | 0011010000 | 6.61E−05 | 6.61E−05 | 3.3E−05 | 1.1E−05 |
| −9.5 | 1 | 10010 | 0011000000 | 7.49E−05 | 7.49E−05 | 3.74E−05 | 1.25E−05 |
| −9.375 | 1 | 10010 | 0010110000 | 8.48E−05 | 8.48E−05 | 4.24E−05 | 1.41E−05 |
| −9.25 | 1 | 10010 | 0010100000 | 9.61E−05 | 9.61E−05 | 4.81E−05 | 1.6E−05 |
| −9.125 | 1 | 10010 | 0010010000 | 0.000109 | 0.000109 | 5.45E−05 | 1.82E−05 |
| −9 | 1 | 10010 | 0010000000 | 0.000123 | 0.000123 | 6.17E−05 | 2.06E−05 |
| −8.875 | 1 | 10010 | 0001110000 | 0.00014 | 0.00014 | 6.99E−05 | 2.33E−05 |
| −8.75 | 1 | 10010 | 0001100000 | 0.000158 | 0.000158 | 7.92E−05 | 2.64E−05 |
| −8.625 | 1 | 10010 | 0001010000 | 0.00018 | 0.00018 | 8.98E−05 | 2.99E−05 |
| −8.5 | 1 | 10010 | 0001000000 | 0.000203 | 0.000203 | 0.000102 | 3.39E−05 |
| −8.375 | 1 | 10010 | 0000110000 | 0.000231 | 0.000231 | 0.000115 | 3.84E−05 |
| −8.25 | 1 | 10010 | 0000100000 | 0.000261 | 0.000261 | 0.000131 | 4.35E−05 |
| −8.125 | 1 | 10010 | 0000010000 | 0.000296 | 0.000296 | 0.000148 | 4.93E−05 |
| −8 | 1 | 10010 | 0000000000 | 0.000335 | 0.000335 | 0.000168 | 5.59E−05 |
| −7.875 | 1 | 10001 | 1111100000 | 0.00038 | 0.00038 | 0.00019 | 6.34E−05 |
| −7.75 | 1 | 10001 | 1111000000 | 0.000431 | 0.000431 | 0.000215 | 7.18E−05 |
| −7.625 | 1 | 10001 | 1110100000 | 0.000488 | 0.000488 | 0.000244 | 8.13E−05 |
| −7.5 | 1 | 10001 | 1110000000 | 0.000553 | 0.000553 | 0.000277 | 9.22E−05 |
| −7.375 | 1 | 10001 | 1101100000 | 0.000627 | 0.000627 | 0.000313 | 0.000104 |
| −7.25 | 1 | 10001 | 1101000000 | 0.00071 | 0.00071 | 0.000355 | 0.000118 |
| −7.125 | 1 | 10001 | 1100100000 | 0.000805 | 0.000805 | 0.000402 | 0.000134 |
| −7 | 1 | 10001 | 1100000000 | 0.000912 | 0.000912 | 0.000456 | 0.000152 |
| −6.875 | 1 | 10001 | 1011100000 | 0.001033 | 0.001033 | 0.000517 | 0.000172 |
| −6.75 | 1 | 10001 | 1011000000 | 0.001171 | 0.001171 | 0.000585 | 0.000195 |
| −6.625 | 1 | 10001 | 1010100000 | 0.001327 | 0.001327 | 0.000663 | 0.000221 |
| −6.5 | 1 | 10001 | 1010000000 | 0.001503 | 0.001503 | 0.000752 | 0.000251 |
| −6.375 | 1 | 10001 | 1001100000 | 0.001704 | 0.001704 | 0.000852 | 0.000284 |
| −6.25 | 1 | 10001 | 1001000000 | 0.00193 | 0.00193 | 0.000965 | 0.000322 |
| −6.125 | 1 | 10001 | 1000100000 | 0.002187 | 0.002187 | 0.001094 | 0.000365 |
| −6 | 1 | 10001 | 1000000000 | 0.002479 | 0.002479 | 0.001239 | 0.000413 |
| −5.875 | 1 | 10001 | 0111100000 | 0.002809 | 0.002809 | 0.001404 | 0.000468 |
| −5.75 | 1 | 10001 | 0111000000 | 0.003183 | 0.003183 | 0.001591 | 0.00053 |
| −5.625 | 1 | 10001 | 0110100000 | 0.003607 | 0.003607 | 0.001803 | 0.000601 |
| −5.5 | 1 | 10001 | 0110000000 | 0.004087 | 0.004087 | 0.002043 | 0.000681 |
| −5.375 | 1 | 10001 | 0101100000 | 0.004631 | 0.004631 | 0.002315 | 0.000772 |
| −5.25 | 1 | 10001 | 0101000000 | 0.005248 | 0.005248 | 0.002624 | 0.000875 |
| −5.125 | 1 | 10001 | 0100100000 | 0.005946 | 0.005946 | 0.002973 | 0.000991 |
| −5 | 1 | 10001 | 0100000000 | 0.006738 | 0.006738 | 0.003369 | 0.001123 |
| −4.875 | 1 | 10001 | 0011100000 | 0.007635 | 0.007635 | 0.003818 | 0.001273 |

TABLE II-continued

| Floating-Point Number (16-bit format) | | | | Main LUT Entries | | | |
|---|---|---|---|---|---|---|---|
| Column A Value | Col. B Sign | Column C exp | Column D Mantissa | Column E a | Column F b | Column G c | Column H d |
| −4.75 | 1 | 10001 | 0011000000 | 0.008652 | 0.008652 | 0.004326 | 0.001442 |
| −4.625 | 1 | 10001 | 0010100000 | 0.009804 | 0.009804 | 0.004902 | 0.001634 |
| −4.5 | 1 | 10001 | 0010000000 | 0.011109 | 0.011109 | 0.005554 | 0.001851 |
| −4.375 | 1 | 10001 | 0001100000 | 0.012588 | 0.012588 | 0.006294 | 0.002098 |
| −4.25 | 1 | 10001 | 0001000000 | 0.014264 | 0.014264 | 0.007132 | 0.002377 |
| −4.125 | 1 | 10001 | 0000100000 | 0.016163 | 0.016163 | 0.008082 | 0.002694 |
| −4 | 1 | 10001 | 0000000000 | 0.018316 | 0.018316 | 0.009158 | 0.003053 |
| −3.875 | 1 | 10000 | 1111000000 | 0.020754 | 0.020754 | 0.010377 | 0.003459 |
| −3.75 | 1 | 10000 | 1110000000 | 0.023518 | 0.023518 | 0.011759 | 0.00392 |
| −3.625 | 1 | 10000 | 1101000000 | 0.026649 | 0.026649 | 0.013325 | 0.004442 |
| −3.5 | 1 | 10000 | 1100000000 | 0.030197 | 0.030197 | 0.015099 | 0.005033 |
| −3.375 | 1 | 10000 | 1011000000 | 0.034218 | 0.034218 | 0.017109 | 0.005703 |
| −3.25 | 1 | 10000 | 1010000000 | 0.038774 | 0.038774 | 0.019387 | 0.006462 |
| −3.125 | 1 | 10000 | 1001000000 | 0.043937 | 0.043937 | 0.021968 | 0.007323 |
| −3 | 1 | 10000 | 1000000000 | 0.049787 | 0.049787 | 0.024894 | 0.008298 |
| −2.875 | 1 | 10000 | 0111000000 | 0.056416 | 0.056416 | 0.028208 | 0.009403 |
| −2.75 | 1 | 10000 | 0110000000 | 0.063928 | 0.063928 | 0.031964 | 0.010655 |
| −2.625 | 1 | 10000 | 0101000000 | 0.07244 | 0.07244 | 0.03622 | 0.012073 |
| −2.5 | 1 | 10000 | 0100000000 | 0.082085 | 0.082085 | 0.041042 | 0.013681 |
| −2.375 | 1 | 10000 | 0011000000 | 0.093014 | 0.093014 | 0.046507 | 0.015502 |
| −2.25 | 1 | 10000 | 0010000000 | 0.105399 | 0.105399 | 0.0527 | 0.017567 |
| −2.125 | 1 | 10000 | 0001000000 | 0.119433 | 0.119433 | 0.059716 | 0.019905 |
| −2 | 1 | 10000 | 0000000000 | 0.135335 | 0.135335 | 0.067668 | 0.022556 |
| −1.875 | 1 | 01111 | 1110000000 | 0.153355 | 0.153355 | 0.076677 | 0.025559 |
| −1.75 | 1 | 01111 | 1100000000 | 0.173774 | 0.173774 | 0.086887 | 0.028962 |
| −1.625 | 1 | 01111 | 1010000000 | 0.196912 | 0.196912 | 0.098456 | 0.032819 |
| −1.5 | 1 | 01111 | 1000000000 | 0.22313 | 0.22313 | 0.111565 | 0.037188 |
| −1.375 | 1 | 01111 | 0110000000 | 0.25284 | 0.25284 | 0.12642 | 0.04214 |
| −1.25 | 1 | 01111 | 0100000000 | 0.286505 | 0.286505 | 0.143252 | 0.047751 |
| −1.125 | 1 | 01111 | 0010000000 | 0.324652 | 0.324652 | 0.162326 | 0.054109 |
| −1 | 1 | 01111 | 0000000000 | 0.367879 | 0.367879 | 0.18394 | 0.061313 |
| −0.875 | 1 | 01110 | 1100000000 | 0.416862 | 0.416862 | 0.208431 | 0.069477 |
| −0.75 | 1 | 01110 | 1000000000 | 0.472367 | 0.472367 | 0.236183 | 0.078728 |
| −0.625 | 1 | 01110 | 0100000000 | 0.535261 | 0.535261 | 0.267631 | 0.08921 |
| −0.5 | 1 | 01110 | 0000000000 | 0.606531 | 0.606531 | 0.303265 | 0.101088 |
| −0.375 | 1 | 01101 | 1000000000 | 0.687289 | 0.687289 | 0.343645 | 0.114548 |
| −0.25 | 1 | 01101 | 0000000000 | 0.778801 | 0.778801 | 0.3894 | 0.1298 |
| −0.125 | 1 | 01100 | 0000000000 | 0.882497 | 0.882497 | 0.441248 | 0.147083 |
| 0 | 0 | 00000 | 0000000000 | 1 | 1 | 0.5 | 0.166667 |
| 0.125 | 0 | 01100 | 0000000000 | 1.133148 | 1.133148 | 0.566574 | 0.188858 |
| 0.25 | 0 | 01101 | 0000000000 | 1.284025 | 1.284025 | 0.642013 | 0.214004 |
| 0.375 | 0 | 01101 | 1000000000 | 1.454991 | 1.454991 | 0.727496 | 0.242499 |
| 0.5 | 0 | 01110 | 0000000000 | 1.648721 | 1.648721 | 0.824361 | 0.274787 |
| 0.625 | 0 | 01110 | 0100000000 | 1.868246 | 1.868246 | 0.934123 | 0.311374 |
| 0.75 | 0 | 01110 | 1000000000 | 2.117 | 2.117 | 1.0585 | 0.352833 |
| 0.875 | 0 | 01110 | 1100000000 | 2.398875 | 2.398875 | 1.199438 | 0.399813 |
| 1 | 0 | 01111 | 0000000000 | 2.718282 | 2.718282 | 1.359141 | 0.453047 |
| 1.125 | 0 | 01111 | 0010000000 | 3.080217 | 3.080217 | 1.540108 | 0.513369 |
| 1.25 | 0 | 01111 | 0100000000 | 3.490343 | 3.490343 | 1.745171 | 0.581724 |
| 1.375 | 0 | 01111 | 0110000000 | 3.955077 | 3.955077 | 1.977538 | 0.659179 |
| 1.5 | 0 | 01111 | 1000000000 | 4.481689 | 4.481689 | 2.240845 | 0.746948 |
| 1.625 | 0 | 01111 | 1010000000 | 5.078419 | 5.078419 | 2.53921 | 0.846403 |
| 1.75 | 0 | 01111 | 1100000000 | 5.754603 | 5.754603 | 2.877301 | 0.9591 |
| 1.875 | 0 | 01111 | 1110000000 | 6.520819 | 6.520819 | 3.26041 | 1.086803 |
| 2 | 0 | 10000 | 0000000000 | 7.389056 | 7.389056 | 3.694528 | 1.231509 |
| 2.125 | 0 | 10000 | 0001000000 | 8.372897 | 8.372897 | 4.186449 | 1.395483 |
| 2.25 | 0 | 10000 | 0010000000 | 9.487736 | 9.487736 | 4.743868 | 1.581289 |
| 2.375 | 0 | 10000 | 0011000000 | 10.75101 | 10.75101 | 5.375507 | 1.791836 |
| 2.5 | 0 | 10000 | 0100000000 | 12.18249 | 12.18249 | 6.091247 | 2.030416 |
| 2.625 | 0 | 10000 | 0101000000 | 13.80457 | 13.80457 | 6.902287 | 2.300762 |
| 2.75 | 0 | 10000 | 0110000000 | 15.64263 | 15.64263 | 7.821316 | 2.607105 |
| 2.875 | 0 | 10000 | 0111000000 | 17.72542 | 17.72542 | 8.862712 | 2.954237 |
| 3 | 0 | 10000 | 1000000000 | 20.08554 | 20.08554 | 10.04277 | 3.347589 |
| 3.125 | 0 | 10000 | 1001000000 | 22.7599 | 22.7599 | 11.37995 | 3.793316 |
| 3.25 | 0 | 10000 | 1010000000 | 25.79034 | 25.79034 | 12.89517 | 4.29839 |
| 3.375 | 0 | 10000 | 1011000000 | 29.22428 | 29.22428 | 14.61214 | 4.870714 |
| 3.5 | 0 | 10000 | 1100000000 | 33.11545 | 33.11545 | 16.55773 | 5.519242 |
| 3.625 | 0 | 10000 | 1101000000 | 37.52472 | 37.52472 | 18.76236 | 6.254121 |
| 3.75 | 0 | 10000 | 1110000000 | 42.52108 | 42.52108 | 21.26054 | 7.086847 |
| 3.875 | 0 | 10000 | 1111000000 | 48.1827 | 48.1827 | 24.09135 | 8.03045 |
| 4 | 0 | 10001 | 0000000000 | 54.59815 | 54.59815 | 27.29908 | 9.099692 |
| 4.125 | 0 | 10001 | 0000100000 | 61.86781 | 61.86781 | 30.9339 | 10.3113 |
| 4.25 | 0 | 10001 | 0001000000 | 70.10541 | 70.10541 | 35.05271 | 11.68424 |
| 4.375 | 0 | 10001 | 0001100000 | 79.43984 | 79.43984 | 39.71992 | 13.23997 |

TABLE II-continued

| Floating-Point Number (16-bit format) | | | | Main LUT Entries | | | |
|---|---|---|---|---|---|---|---|
| Column A Value | Col. B Sign | Column C exp | Column D Mantissa | Column E a | Column F b | Column G c | Column H d |
| 4.5 | 0 | 10001 | 0010000000 | 90.01713 | 90.01713 | 45.00857 | 15.00286 |
| 4.625 | 0 | 10001 | 0010100000 | 102.0028 | 102.0028 | 51.00139 | 17.00046 |
| 4.75 | 0 | 10001 | 0011000000 | 115.5843 | 115.5843 | 57.79214 | 19.26405 |
| 4.875 | 0 | 10001 | 0011100000 | 130.9742 | 130.9742 | 65.48708 | 21.82903 |
| 5 | 0 | 10001 | 0100000000 | 148.4132 | 148.4132 | 74.20658 | 24.73553 |
| 5.125 | 0 | 10001 | 0100100000 | 168.1741 | 168.1741 | 84.08707 | 28.02902 |
| 5.25 | 0 | 10001 | 0101000000 | 190.5663 | 190.5663 | 95.28313 | 31.76104 |
| 5.375 | 0 | 10001 | 0101100000 | 215.9399 | 215.9399 | 107.9699 | 35.98998 |
| 5.5 | 0 | 10001 | 0110000000 | 244.6919 | 244.6919 | 122.346 | 40.78199 |
| 5.625 | 0 | 10001 | 0110100000 | 277.2723 | 277.2723 | 138.6361 | 46.21205 |
| 5.75 | 0 | 10001 | 0111000000 | 314.1907 | 314.1907 | 157.0953 | 52.36511 |
| 5.875 | 0 | 10001 | 0111100000 | 356.0247 | 356.0247 | 178.0123 | 59.33744 |
| 6 | 0 | 10001 | 1000000000 | 403.4288 | 403.4288 | 201.7144 | 67.23813 |
| 6.125 | 0 | 10001 | 1000100000 | 457.1447 | 457.1447 | 228.5724 | 76.19079 |
| 6.25 | 0 | 10001 | 1001000000 | 518.0128 | 518.0128 | 259.0064 | 86.33547 |
| 6.375 | 0 | 10001 | 1001100000 | 586.9854 | 586.9854 | 293.4927 | 97.83091 |
| 6.5 | 0 | 10001 | 1010000000 | 665.1416 | 665.1416 | 332.5708 | 110.8569 |
| 6.625 | 0 | 10001 | 1010100000 | 753.7042 | 753.7042 | 376.8521 | 125.6174 |
| 6.75 | 0 | 10001 | 1011000000 | 854.0588 | 854.0588 | 427.0294 | 142.3431 |
| 6.875 | 0 | 10001 | 1011100000 | 967.7754 | 967.7754 | 483.8877 | 161.2959 |
| 7 | 0 | 10001 | 1100000000 | 1096.633 | 1096.633 | 548.3166 | 182.7722 |
| 7.125 | 0 | 10001 | 1100100000 | 1242.648 | 1242.648 | 621.3241 | 207.108 |
| 7.25 | 0 | 10001 | 1101000000 | 1408.105 | 1408.105 | 704.0524 | 234.6841 |
| 7.375 | 0 | 10001 | 1101100000 | 1595.592 | 1595.592 | 797.7959 | 265.932 |
| 7.5 | 0 | 10001 | 1110000000 | 1808.042 | 1808.042 | 904.0212 | 301.3404 |
| 7.625 | 0 | 10001 | 1110100000 | 2048.78 | 2048.78 | 1024.39 | 341.4634 |
| 7.75 | 0 | 10001 | 1111000000 | 2321.572 | 2321.572 | 1160.786 | 386.9287 |
| 7.875 | 0 | 10001 | 1111100000 | 2630.686 | 2630.686 | 1315.343 | 438.4477 |
| 8 | 0 | 10010 | 0000000000 | 2980.958 | 2980.958 | 1490.479 | 496.8263 |
| 8.25 | 0 | 10010 | 0000100000 | 3827.626 | 3827.626 | 1913.813 | 637.9376 |
| 8.5 | 0 | 10010 | 0001000000 | 4914.769 | 4914.769 | 2457.384 | 819.1281 |
| 8.75 | 0 | 10010 | 0001100000 | 6310.688 | 6310.688 | 3155.344 | 1051.781 |
| 9 | 0 | 10010 | 0010000000 | 8103.084 | 8103.084 | 4051.542 | 1350.514 |
| 9.25 | 0 | 10010 | 0010100000 | 10404.57 | 10404.57 | 5202.283 | 1734.094 |
| 9.5 | 0 | 10010 | 0011000000 | 13359.73 | 13359.73 | 6679.863 | 2226.621 |
| 9.75 | 0 | 10010 | 0011100000 | 17154.23 | 17154.23 | 8577.114 | 2859.038 |
| 10 | 0 | 10010 | 0100000000 | 22026.47 | 22026.47 | 11013.23 | 3671.078 |
| 10.25 | 0 | 10010 | 0100100000 | 28282.54 | 28282.54 | 14141.27 | 4713.757 |
| 10.5 | 0 | 10010 | 0101000000 | 36315.5 | 36315.5 | 18157.75 | 6052.584 |
| 10.75 | 0 | 10010 | 0101100000 | 46630.03 | 46630.03 | 23315.01 | 7771.671 |
| 11 | 0 | 10010 | 0110000000 | 59874.14 | 59874.14 | 29937.07 | 9979.024 |
| 11.25 | 0 | 10010 | 0110100000 | 76879.92 | 76879.92 | 38439.96 | 12813.32 |
| 11.5 | 0 | 10010 | 0111000000 | 98715.77 | 98715.77 | 49357.89 | 16452.63 |
| 11.75 | 0 | 10010 | 0111100000 | 126753.6 | 126753.6 | 63376.78 | 21125.59 |
| 12 | 0 | 10010 | 1000000000 | 162754.8 | 162754.8 | 81377.4 | 27125.8 |
| 12.25 | 0 | 10010 | 1000100000 | 208981.3 | 208981.3 | 104490.6 | 34830.21 |
| 12.5 | 0 | 10010 | 1001000000 | 268337.3 | 268337.3 | 134168.6 | 44722.88 |
| 12.75 | 0 | 10010 | 1001100000 | 344551.9 | 344551.9 | 172275.9 | 57425.32 |
| 13 | 0 | 10010 | 1010000000 | 442413.4 | 442413.4 | 221206.7 | 73735.57 |
| 13.25 | 0 | 10010 | 1010100000 | 568070 | 568070 | 284035 | 94678.34 |
| 13.5 | 0 | 10010 | 1011000000 | 729416.4 | 729416.4 | 364708.2 | 121569.4 |
| 13.75 | 0 | 10010 | 1011100000 | 936589.2 | 936589.2 | 468294.6 | 156098.2 |
| 14 | 0 | 10010 | 1100000000 | 1202604 | 1202604 | 601302.1 | 200434 |
| 14.25 | 0 | 10010 | 1100100000 | 1544174 | 1544174 | 772087.2 | 257362.4 |
| 14.5 | 0 | 10010 | 1101000000 | 1982759 | 1982759 | 991379.6 | 330459.9 |
| 14.75 | 0 | 10010 | 1101100000 | 2545913 | 2545913 | 1272957 | 424318.9 |
| 15 | 0 | 10010 | 1110000000 | 3269017 | 3269017 | 1634509 | 544836.2 |
| 15.25 | 0 | 10010 | 1110100000 | 4197501 | 4197501 | 2098751 | 699583.6 |
| 15.5 | 0 | 10010 | 1111000000 | 5389698 | 5389698 | 2694849 | 898283.1 |

TABLE III

| Floating-Point Number (16-bit format) | | | | Theoretical output | Calculated errors on sample mid-points | Mid-point theoretical output | Delta |
|---|---|---|---|---|---|---|---|
| Value | Sign | exp | Mantissa | | | | |
| −31 | 1 | 10011 | 1111000000 | 3.44E−14 | −30.5 | 5.68E−14 | 0.5 |
| −30 | 1 | 10011 | 1110000000 | 9.36E−14 | −29.5 | 1.54E−13 | 0.5 |
| −29 | 1 | 10011 | 1101000000 | 2.54E−13 | −28.5 | 4.19E−13 | 0.5 |

TABLE III-continued

| Floating-Point Number (16-bit format) | | | | Theoretical output | Calculated errors on sample mid-points | Mid-point theoretical output | Delta |
|---|---|---|---|---|---|---|---|
| Value | Sign | exp | Mantissa | | | | |
| −28 | 1 | 10011 | 1100000000 | 6.91E−13 | −27.5 | 1.14E−12 | 0.5 |
| −27 | 1 | 10011 | 1011000000 | 1.88E−12 | −26.5 | 3.1E−12 | 0.5 |
| −26 | 1 | 10011 | 1010000000 | 5.11E−12 | −25.5 | 8.42E−12 | 0.5 |
| −25 | 1 | 10011 | 1001000000 | 1.39E−11 | −24.5 | 2.29E−11 | 0.5 |
| −24 | 1 | 10011 | 1000000000 | 3.78E−11 | −23.5 | 6.22E−11 | 0.5 |
| −23 | 1 | 10011 | 0111000000 | 1.03E−10 | −22.5 | 1.69E−10 | 0.5 |
| −22 | 1 | 10011 | 0110000000 | 2.79E−10 | −21.5 | 4.6E−10 | 0.5 |
| −21 | 1 | 10011 | 0101000000 | 7.58E−10 | −20.5 | 1.25E−09 | 0.5 |
| −20 | 1 | 10011 | 0100000000 | 2.06E−09 | −19.5 | 3.4E−09 | 0.5 |
| −19 | 1 | 10011 | 0011000000 | 5.6E−09 | −18.5 | 9.24E−09 | 0.5 |
| −18 | 1 | 10011 | 0010000000 | 1.52E−08 | −17.5 | 2.51E−08 | 0.5 |
| −17 | 1 | 10011 | 0001000000 | 4.14E−08 | −16.5 | 6.83E−08 | 0.5 |
| −16 | 1 | 10011 | 0000000000 | 1.13E−07 | −15.9375 | 1.2E−07 | 0.0625 |
| −15.875 | 1 | 10010 | 1111110000 | 1.28E−07 | −15.8125 | 1.36E−07 | 0.0625 |
| −15.75 | 1 | 10010 | 1111100000 | 1.44E−07 | −15.6875 | 1.54E−07 | 0.0625 |
| −15.625 | 1 | 10010 | 1111010000 | 1.64E−07 | −15.5625 | 1.74E−07 | 0.0625 |
| −15.5 | 1 | 10010 | 1111000000 | 1.86E−07 | −15.4375 | 1.98E−07 | 0.0625 |
| −15.375 | 1 | 10010 | 1110110000 | 2.1E−07 | −15.3125 | 2.24E−07 | 0.0625 |
| −15.25 | 1 | 10010 | 1110100000 | 2.38E−07 | −15.1875 | 2.54E−07 | 0.0625 |
| −15.125 | 1 | 10010 | 1110010000 | 2.7E−07 | −15.0625 | 2.87E−07 | 0.0625 |
| −15 | 1 | 10010 | 1110000000 | 3.06E−07 | −14.9375 | 3.26E−07 | 0.0625 |
| −14.875 | 1 | 10010 | 1101110000 | 3.47E−07 | −14.8125 | 3.69E−07 | 0.0625 |
| −14.75 | 1 | 10010 | 1101100000 | 3.93E−07 | −14.6875 | 4.18E−07 | 0.0625 |
| −14.625 | 1 | 10010 | 1101010000 | 4.45E−07 | −14.5625 | 4.74E−07 | 0.0625 |
| −14.5 | 1 | 10010 | 1101000000 | 5.04E−07 | −14.4375 | 5.37E−07 | 0.0625 |
| −14.375 | 1 | 10010 | 1100110000 | 5.72E−07 | −14.3125 | 6.08E−07 | 0.0625 |
| −14.25 | 1 | 10010 | 1100100000 | 6.48E−07 | −14.1875 | 6.89E−07 | 0.0625 |
| −14.125 | 1 | 10010 | 1100010000 | 7.34E−07 | −14.0625 | 7.81E−07 | 0.0625 |
| −14 | 1 | 10010 | 1100000000 | 8.32E−07 | −13.9375 | 8.85E−07 | 0.0625 |
| −13.875 | 1 | 10010 | 1011110000 | 9.42E−07 | −13.8125 | 1E−06 | 0.0625 |
| −13.75 | 1 | 10010 | 1011100000 | 1.07E−06 | −13.6875 | 1.14E−06 | 0.0625 |
| −13.625 | 1 | 10010 | 1011010000 | 1.21E−06 | −13.5625 | 1.29E−06 | 0.0625 |
| −13.5 | 1 | 10010 | 1011000000 | 1.37E−06 | −13.4375 | 1.46E−06 | 0.0625 |
| −13.375 | 1 | 10010 | 1010110000 | 1.55E−06 | −13.3125 | 1.65E−06 | 0.0625 |
| −13.25 | 1 | 10010 | 1010100000 | 1.76E−06 | −13.1875 | 1.87E−06 | 0.0625 |
| −13.125 | 1 | 10010 | 1010010000 | 1.99E−06 | −13.0625 | 2.12E−06 | 0.0625 |
| −13 | 1 | 10010 | 1010000000 | 2.26E−06 | −12.9375 | 2.41E−06 | 0.0625 |
| −12.875 | 1 | 10010 | 1001110000 | 2.56E−06 | −12.8125 | 2.73E−06 | 0.0625 |
| −12.75 | 1 | 10010 | 1001100000 | 2.9E−06 | −12.6875 | 3.09E−06 | 0.0625 |
| −12.625 | 1 | 10010 | 1001010000 | 3.29E−06 | −12.5625 | 3.5E−06 | 0.0625 |
| −12.5 | 1 | 10010 | 1001000000 | 3.73E−06 | −12.4375 | 3.97E−06 | 0.0625 |
| −12.375 | 1 | 10010 | 1000110000 | 4.22E−06 | −12.3125 | 4.5E−06 | 0.0625 |
| −12.25 | 1 | 10010 | 1000100000 | 4.79E−06 | −12.1875 | 5.09E−06 | 0.0625 |
| −12.125 | 1 | 10010 | 1000010000 | 5.42E−06 | −12.0625 | 5.77E−06 | 0.0625 |
| −12 | 1 | 10010 | 1000000000 | 6.14E−06 | −11.9375 | 6.54E−06 | 0.0625 |
| −11.875 | 1 | 10010 | 0111110000 | 6.96E−06 | −11.8125 | 7.41E−06 | 0.0625 |
| −11.75 | 1 | 10010 | 0111100000 | 7.89E−06 | −11.6875 | 8.4E−06 | 0.0625 |
| −11.625 | 1 | 10010 | 0111010000 | 8.94E−06 | −11.5625 | 9.52E−06 | 0.0625 |
| −11.5 | 1 | 10010 | 0111000000 | 1.01E−05 | −11.4375 | 1.08E−05 | 0.0625 |
| −11.375 | 1 | 10010 | 0110110000 | 1.15E−05 | −11.3125 | 1.22E−05 | 0.0625 |
| −11.25 | 1 | 10010 | 0110100000 | 1.3E−05 | −11.1875 | 1.38E−05 | 0.0625 |
| −11.125 | 1 | 10010 | 0110010000 | 1.47E−05 | −11.0625 | 1.57E−05 | 0.0625 |
| −11 | 1 | 10010 | 0110000000 | 1.67E−05 | −10.9375 | 1.78E−05 | 0.0625 |
| −10.875 | 1 | 10010 | 0101110000 | 1.89E−05 | −10.8125 | 2.01E−05 | 0.0625 |
| −10.75 | 1 | 10010 | 0101100000 | 2.14E−05 | −10.6875 | 2.28E−05 | 0.0625 |
| −10.625 | 1 | 10010 | 0101010000 | 2.43E−05 | −10.5625 | 2.59E−05 | 0.0625 |
| −10.5 | 1 | 10010 | 0101000000 | 2.75E−05 | −10.4375 | 2.93E−05 | 0.0625 |
| −10.375 | 1 | 10010 | 0100110000 | 3.12E−05 | −10.3125 | 3.32E−05 | 0.0625 |
| −10.25 | 1 | 10010 | 0100100000 | 3.54E−05 | −10.1875 | 3.76E−05 | 0.0625 |
| −10.125 | 1 | 10010 | 0100010000 | 4.01E−05 | −10.0625 | 4.26E−05 | 0.0625 |
| −10 | 1 | 10010 | 0100000000 | 4.54E−05 | −9.9375 | 4.83E−05 | 0.0625 |
| −9.875 | 1 | 10010 | 0011110000 | 5.14E−05 | −9.8125 | 5.48E−05 | 0.0625 |
| −9.75 | 1 | 10010 | 0011100000 | 5.83E−05 | −9.6875 | 6.21E−05 | 0.0625 |
| −9.625 | 1 | 10010 | 0011010000 | 6.61E−05 | −9.5625 | 7.03E−05 | 0.0625 |
| −9.5 | 1 | 10010 | 0011000000 | 7.49E−05 | −9.4375 | 7.97E−05 | 0.0625 |
| −9.375 | 1 | 10010 | 0010110000 | 8.48E−05 | −9.3125 | 9.03E−05 | 0.0625 |
| −9.25 | 1 | 10010 | 0010100000 | 9.61E−05 | −9.1875 | 0.000102 | 0.0625 |
| −9.125 | 1 | 10010 | 0010010000 | 0.000109 | −9.0625 | 0.000116 | 0.0625 |
| −9 | 1 | 10010 | 0010000000 | 0.000123 | −8.9375 | 0.000131 | 0.0625 |
| −8.875 | 1 | 10010 | 0001110000 | 0.00014 | −8.8125 | 0.000149 | 0.0625 |
| −8.75 | 1 | 10010 | 0001100000 | 0.000158 | −8.6875 | 0.000169 | 0.0625 |
| −8.625 | 1 | 10010 | 0001010000 | 0.00018 | −8.5625 | 0.000191 | 0.0625 |
| −8.5 | 1 | 10010 | 0001000000 | 0.000203 | −8.4375 | 0.000217 | 0.0625 |
| −8.375 | 1 | 10010 | 0000110000 | 0.000231 | −8.3125 | 0.000245 | 0.0625 |

TABLE III-continued

| Floating-Point Number (16-bit format) | | | | Theoretical output | Calculated errors on sample mid-points | Mid-point theoretical output | Delta |
|---|---|---|---|---|---|---|---|
| Value | Sign | exp | Mantissa | | | | |
| −8.25 | 1 | 10010 | 0000100000 | 0.000261 | −8.1875 | 0.000278 | 0.0625 |
| −8.125 | 1 | 10010 | 0000010000 | 0.000296 | −8.0625 | 0.000315 | 0.0625 |
| −8 | 1 | 10010 | 0000000000 | 0.000335 | −7.9375 | 0.000357 | 0.0625 |
| −7.875 | 1 | 10001 | 1111100000 | 0.00038 | −7.8125 | 0.000405 | 0.0625 |
| −7.75 | 1 | 10001 | 1111000000 | 0.000431 | −7.6875 | 0.000459 | 0.0625 |
| −7.625 | 1 | 10001 | 1110100000 | 0.000488 | −7.5625 | 0.00052 | 0.0625 |
| −7.5 | 1 | 10001 | 1110000000 | 0.000553 | −7.4375 | 0.000589 | 0.0625 |
| −7.375 | 1 | 10001 | 1101100000 | 0.000627 | −7.3125 | 0.000667 | 0.0625 |
| −7.25 | 1 | 10001 | 1101000000 | 0.00071 | −7.1875 | 0.000756 | 0.0625 |
| −7.125 | 1 | 10001 | 1100100000 | 0.000805 | −7.0625 | 0.000857 | 0.0625 |
| −7 | 1 | 10001 | 1100000000 | 0.000912 | −6.9375 | 0.000971 | 0.0625 |
| −6.875 | 1 | 10001 | 1011100000 | 0.001033 | −6.8125 | 0.0011 | 0.0625 |
| −6.75 | 1 | 10001 | 1011000000 | 0.001171 | −6.6875 | 0.001246 | 0.0625 |
| −6.625 | 1 | 10001 | 1010100000 | 0.001327 | −6.5625 | 0.001412 | 0.0625 |
| −6.5 | 1 | 10001 | 1010000000 | 0.001503 | −6.4375 | 0.0016 | 0.0625 |
| −6.375 | 1 | 10001 | 1001100000 | 0.001704 | −6.3125 | 0.001813 | 0.0625 |
| −6.25 | 1 | 10001 | 1001000000 | 0.00193 | −6.1875 | 0.002055 | 0.0625 |
| −6.125 | 1 | 10001 | 1000100000 | 0.002187 | −6.0625 | 0.002329 | 0.0625 |
| −6 | 1 | 10001 | 1000000000 | 0.002479 | −5.9375 | 0.002639 | 0.0625 |
| −5.875 | 1 | 10001 | 0111100000 | 0.002809 | −5.8125 | 0.00299 | 0.0625 |
| −5.75 | 1 | 10001 | 0111000000 | 0.003183 | −5.6875 | 0.003388 | 0.0625 |
| −5.625 | 1 | 10001 | 0110100000 | 0.003607 | −5.5625 | 0.003839 | 0.0625 |
| −5.5 | 1 | 10001 | 0110000000 | 0.004087 | −5.4375 | 0.00435 | 0.0625 |
| −5.375 | 1 | 10001 | 0101100000 | 0.004631 | −5.3125 | 0.00493 | 0.0625 |
| −5.25 | 1 | 10001 | 0101000000 | 0.005248 | −5.1875 | 0.005586 | 0.0625 |
| −5.125 | 1 | 10001 | 0100100000 | 0.005946 | −5.0625 | 0.00633 | 0.0625 |
| −5 | 1 | 10001 | 0100000000 | 0.006738 | −4.9375 | 0.007173 | 0.0625 |
| −4.875 | 1 | 10001 | 0011100000 | 0.007635 | −4.8125 | 0.008128 | 0.0625 |
| −4.75 | 1 | 10001 | 0011000000 | 0.008652 | −4.6875 | 0.00921 | 0.0625 |
| −4.625 | 1 | 10001 | 0010100000 | 0.009804 | −4.5625 | 0.010436 | 0.0625 |
| −4.5 | 1 | 10001 | 0010000000 | 0.011109 | −4.4375 | 0.011825 | 0.0625 |
| −4.375 | 1 | 10001 | 0001100000 | 0.012588 | −4.3125 | 0.0134 | 0.0625 |
| −4.25 | 1 | 10001 | 0001000000 | 0.014264 | −4.1875 | 0.015184 | 0.0625 |
| −4.125 | 1 | 10001 | 0000100000 | 0.016163 | −4.0625 | 0.017206 | 0.0625 |
| −4 | 1 | 10001 | 0000000000 | 0.018316 | −3.9375 | 0.019497 | 0.0625 |
| −3.875 | 1 | 10000 | 1111000000 | 0.020754 | −3.8125 | 0.022093 | 0.0625 |
| −3.75 | 1 | 10000 | 1110000000 | 0.023518 | −3.6875 | 0.025035 | 0.0625 |
| −3.625 | 1 | 10000 | 1101000000 | 0.026649 | −3.5625 | 0.028368 | 0.0625 |
| −3.5 | 1 | 10000 | 1100000000 | 0.030197 | −3.4375 | 0.032145 | 0.0625 |
| −3.375 | 1 | 10000 | 1011000000 | 0.034218 | −3.3125 | 0.036425 | 0.0625 |
| −3.25 | 1 | 10000 | 1010000000 | 0.038774 | −3.1875 | 0.041275 | 0.0625 |
| −3.125 | 1 | 10000 | 1001000000 | 0.043937 | −3.0625 | 0.046771 | 0.0625 |
| −3 | 1 | 10000 | 1000000000 | 0.049787 | −2.9375 | 0.052998 | 0.0625 |
| −2.875 | 1 | 10000 | 0111000000 | 0.056416 | −2.8125 | 0.060055 | 0.0625 |
| −2.75 | 1 | 10000 | 0110000000 | 0.063928 | −2.6875 | 0.068051 | 0.0625 |
| −2.625 | 1 | 10000 | 0101000000 | 0.07244 | −2.5625 | 0.077112 | 0.0625 |
| −2.5 | 1 | 10000 | 0100000000 | 0.082085 | −2.4375 | 0.087379 | 0.0625 |
| −2.375 | 1 | 10000 | 0011000000 | 0.093014 | −2.3125 | 0.099013 | 0.0625 |
| −2.25 | 1 | 10000 | 0010000000 | 0.105399 | −2.1875 | 0.112197 | 0.0625 |
| −2.125 | 1 | 10000 | 0001000000 | 0.119433 | −2.0625 | 0.127136 | 0.0625 |
| −2 | 1 | 10000 | 0000000000 | 0.135335 | −1.9375 | 0.144064 | 0.0625 |
| −1.875 | 1 | 01111 | 1110000000 | 0.153355 | −1.8125 | 0.163246 | 0.0625 |
| −1.75 | 1 | 01111 | 1100000000 | 0.173774 | −1.6875 | 0.184981 | 0.0625 |
| −1.625 | 1 | 01111 | 1010000000 | 0.196912 | −1.5625 | 0.209611 | 0.0625 |
| −1.5 | 1 | 01111 | 1000000000 | 0.22313 | −1.4375 | 0.237521 | 0.0625 |
| −1.375 | 1 | 01111 | 0110000000 | 0.25284 | −1.3125 | 0.269146 | 0.0625 |
| −1.25 | 1 | 01111 | 0100000000 | 0.286505 | −1.1875 | 0.304983 | 0.0625 |
| −1.125 | 1 | 01111 | 0010000000 | 0.324652 | −1.0625 | 0.345591 | 0.0625 |
| −1 | 1 | 01111 | 0000000000 | 0.367879 | −0.9375 | 0.391606 | 0.0625 |
| −0.875 | 1 | 01110 | 1100000000 | 0.416862 | −0.8125 | 0.443747 | 0.0625 |
| −0.75 | 1 | 01110 | 1000000000 | 0.472367 | −0.6875 | 0.502832 | 0.0625 |
| −0.625 | 1 | 01110 | 0100000000 | 0.535261 | −0.5625 | 0.569783 | 0.0625 |
| −0.5 | 1 | 01110 | 0000000000 | 0.606531 | −0.4375 | 0.645649 | 0.0625 |
| −0.375 | 1 | 01101 | 1000000000 | 0.687289 | −0.3125 | 0.731616 | 0.0625 |
| −0.25 | 1 | 01101 | 0000000000 | 0.778801 | −0.1875 | 0.829029 | 0.0625 |
| −0.125 | 1 | 01100 | 0000000000 | 0.882497 | −0.0625 | 0.939413 | 0.0625 |
| 0 | 0 | 00000 | 0000000000 | 1 | 0.0625 | 1.064494 | 0.0625 |
| 0.125 | 0 | 01100 | 0000000000 | 1.133148 | 0.1875 | 1.20623 | 0.0625 |
| 0.25 | 0 | 01101 | 0000000000 | 1.284025 | 0.3125 | 1.366838 | 0.0625 |
| 0.375 | 0 | 01101 | 1000000000 | 1.454991 | 0.4375 | 1.54883 | 0.0625 |
| 0.5 | 0 | 01110 | 0000000000 | 1.648721 | 0.5625 | 1.755055 | 0.0625 |
| 0.625 | 0 | 01110 | 0100000000 | 1.868246 | 0.6875 | 1.988737 | 0.0625 |
| 0.75 | 0 | 01110 | 1000000000 | 2.117 | 0.8125 | 2.253535 | 0.0625 |
| 0.875 | 0 | 01110 | 1100000000 | 2.398875 | 0.9375 | 2.553589 | 0.0625 |

TABLE III-continued

| Floating-Point Number (16-bit format) | | | | Theoretical output | Calculated errors on sample mid-points | Mid-point theoretical output | Delta |
|---|---|---|---|---|---|---|---|
| Value | Sign | exp | Mantissa | | | | |
| 1 | 0 | 01111 | 0000000000 | 2.718282 | 1.0625 | 2.893596 | 0.0625 |
| 1.125 | 0 | 01111 | 0010000000 | 3.080217 | 1.1875 | 3.278874 | 0.0625 |
| 1.25 | 0 | 01111 | 0100000000 | 3.490343 | 1.3125 | 3.715451 | 0.0625 |
| 1.375 | 0 | 01111 | 0110000000 | 3.955077 | 1.4375 | 4.210157 | 0.0625 |
| 1.5 | 0 | 01111 | 1000000000 | 4.481689 | 1.5625 | 4.770733 | 0.0625 |
| 1.625 | 0 | 01111 | 1010000000 | 5.078419 | 1.6875 | 5.405949 | 0.0625 |
| 1.75 | 0 | 01111 | 1100000000 | 5.754603 | 1.8125 | 6.125743 | 0.0625 |
| 1.875 | 0 | 01111 | 1110000000 | 6.520819 | 1.9375 | 6.941376 | 0.0625 |
| 2 | 0 | 10000 | 0000000000 | 7.389056 | 2.0625 | 7.865609 | 0.0625 |
| 2.125 | 0 | 10000 | 0001000000 | 8.372897 | 2.1875 | 8.912903 | 0.0625 |
| 2.25 | 0 | 10000 | 0010000000 | 9.487736 | 2.3125 | 10.09964 | 0.0625 |
| 2.375 | 0 | 10000 | 0011000000 | 10.75101 | 2.4375 | 11.44439 | 0.0625 |
| 2.5 | 0 | 10000 | 0100000000 | 12.18249 | 2.5625 | 12.9682 | 0.0625 |
| 2.625 | 0 | 10000 | 0101000000 | 13.80457 | 2.6875 | 14.69489 | 0.0625 |
| 2.75 | 0 | 10000 | 0110000000 | 15.64263 | 2.8125 | 16.65149 | 0.0625 |
| 2.875 | 0 | 10000 | 0111000000 | 17.72542 | 2.9375 | 18.86862 | 0.0625 |
| 3 | 0 | 10000 | 1000000000 | 20.08554 | 3.0625 | 21.38094 | 0.0625 |
| 3.125 | 0 | 10000 | 1001000000 | 22.7599 | 3.1875 | 24.22778 | 0.0625 |
| 3.25 | 0 | 10000 | 1010000000 | 25.79034 | 3.3125 | 27.45367 | 0.0625 |
| 3.375 | 0 | 10000 | 1011000000 | 29.22428 | 3.4375 | 31.10909 | 0.0625 |
| 3.5 | 0 | 10000 | 1100000000 | 33.11545 | 3.5625 | 35.25122 | 0.0625 |
| 3.625 | 0 | 10000 | 1101000000 | 37.52472 | 3.6875 | 39.94486 | 0.0625 |
| 3.75 | 0 | 10000 | 1110000000 | 42.52108 | 3.8125 | 45.26346 | 0.0625 |
| 3.875 | 0 | 10000 | 1111000000 | 48.1827 | 3.9375 | 51.29022 | 0.0625 |
| 4 | 0 | 10001 | 0000000000 | 54.59815 | 4.0625 | 58.11943 | 0.0625 |
| 4.125 | 0 | 10001 | 0000100000 | 61.86781 | 4.1875 | 65.85794 | 0.0625 |
| 4.25 | 0 | 10001 | 0001000000 | 70.10541 | 4.3125 | 74.62682 | 0.0625 |
| 4.375 | 0 | 10001 | 0001100000 | 79.43984 | 4.4375 | 84.56327 | 0.0625 |
| 4.5 | 0 | 10001 | 0010000000 | 90.01713 | 4.5625 | 95.82274 | 0.0625 |
| 4.625 | 0 | 10001 | 0010100000 | 102.0028 | 4.6875 | 108.5814 | 0.0625 |
| 4.75 | 0 | 10001 | 0011000000 | 115.5843 | 4.8125 | 123.0388 | 0.0625 |
| 4.875 | 0 | 10001 | 0011100000 | 130.9742 | 4.9375 | 139.4213 | 0.0625 |
| 5 | 0 | 10001 | 0100000000 | 148.4132 | 5.0625 | 157.985 | 0.0625 |
| 5.125 | 0 | 10001 | 0100100000 | 168.1741 | 5.1875 | 179.0204 | 0.0625 |
| 5.25 | 0 | 10001 | 0101000000 | 190.5663 | 5.3125 | 202.8567 | 0.0625 |
| 5.375 | 0 | 10001 | 0101100000 | 215.9399 | 5.4375 | 229.8668 | 0.0625 |
| 5.5 | 0 | 10001 | 0110000000 | 244.6919 | 5.5625 | 260.4732 | 0.0625 |
| 5.625 | 0 | 10001 | 0110100000 | 277.2723 | 5.6875 | 295.1548 | 0.0625 |
| 5.75 | 0 | 10001 | 0111000000 | 314.1907 | 5.8125 | 334.4542 | 0.0625 |
| 5.875 | 0 | 10001 | 0111100000 | 356.0247 | 5.9375 | 378.9863 | 0.0625 |
| 6 | 0 | 10001 | 1000000000 | 403.4288 | 6.0625 | 429.4477 | 0.0625 |
| 6.125 | 0 | 10001 | 1000100000 | 457.1447 | 6.1875 | 486.628 | 0.0625 |
| 6.25 | 0 | 10001 | 1001000000 | 518.0128 | 6.3125 | 551.4218 | 0.0625 |
| 6.375 | 0 | 10001 | 1001100000 | 586.9854 | 6.4375 | 624.8427 | 0.0625 |
| 6.5 | 0 | 10001 | 1010000000 | 665.1416 | 6.5625 | 708.0396 | 0.0625 |
| 6.625 | 0 | 10001 | 1010100000 | 753.7042 | 6.6875 | 802.314 | 0.0625 |
| 6.75 | 0 | 10001 | 1011000000 | 854.0588 | 6.8125 | 909.1408 | 0.0625 |
| 6.875 | 0 | 10001 | 1011100000 | 967.7754 | 6.9375 | 1030.192 | 0.0625 |
| 7 | 0 | 10001 | 1100000000 | 1096.633 | 7.0625 | 1167.36 | 0.0625 |
| 7.125 | 0 | 10001 | 1100100000 | 1242.648 | 7.1875 | 1322.792 | 0.0625 |
| 7.25 | 0 | 10001 | 1101000000 | 1408.105 | 7.3125 | 1498.92 | 0.0625 |
| 7.375 | 0 | 10001 | 1101100000 | 1595.592 | 7.4375 | 1698.499 | 0.0625 |
| 7.5 | 0 | 10001 | 1110000000 | 1808.042 | 7.5625 | 1924.651 | 0.0625 |
| 7.625 | 0 | 10001 | 1110100000 | 2048.78 | 7.6875 | 2180.915 | 0.0625 |
| 7.75 | 0 | 10001 | 1111000000 | 2321.572 | 7.8125 | 2471.301 | 0.0625 |
| 7.875 | 0 | 10001 | 1111100000 | 2630.686 | 7.9375 | 2800.351 | 0.0625 |
| 8 | 0 | 10010 | 0000000000 | 2980.958 | 8.125 | 3377.868 | 0.125 |
| 8.25 | 0 | 10010 | 0000100000 | 3827.626 | 8.375 | 4337.268 | 0.125 |
| 8.5 | 0 | 10010 | 0001000000 | 4914.769 | 8.625 | 5569.163 | 0.125 |
| 8.75 | 0 | 10010 | 0001100000 | 6310.688 | 8.875 | 7150.946 | 0.125 |
| 9 | 0 | 10010 | 0010000000 | 8103.084 | 9.125 | 9181.997 | 0.125 |
| 9.25 | 0 | 10010 | 0010100000 | 10404.57 | 9.375 | 11789.92 | 0.125 |
| 9.5 | 0 | 10010 | 0011000000 | 13359.73 | 9.625 | 15138.55 | 0.125 |
| 9.75 | 0 | 10010 | 0011100000 | 17154.23 | 9.875 | 19438.29 | 0.125 |
| 10 | 0 | 10010 | 0100000000 | 22026.47 | 10.125 | 24959.26 | 0.125 |
| 10.25 | 0 | 10010 | 0100100000 | 28282.54 | 10.375 | 32048.32 | 0.125 |
| 10.5 | 0 | 10010 | 0101000000 | 36315.5 | 10.625 | 41150.86 | 0.125 |
| 10.75 | 0 | 10010 | 0101100000 | 46630.03 | 10.875 | 52838.74 | 0.125 |
| 11 | 0 | 10010 | 0110000000 | 59874.14 | 11.125 | 67846.29 | 0.125 |
| 11.25 | 0 | 10010 | 0110100000 | 76879.92 | 11.375 | 87116.36 | 0.125 |
| 11.5 | 0 | 10010 | 0111000000 | 98715.77 | 11.625 | 111859.6 | 0.125 |
| 11.75 | 0 | 10010 | 0111100000 | 126753.6 | 11.875 | 143630.6 | 0.125 |
| 12 | 0 | 10010 | 1000000000 | 162754.8 | 12.125 | 184425.3 | 0.125 |
| 12.25 | 0 | 10010 | 1000100000 | 208981.3 | 12.375 | 236806.8 | 0.125 |

TABLE III-continued

| Floating-Point Number (16-bit format) | | | | Theoretical output | Calculated errors on sample mid-points | Mid-point theoretical output | Delta |
|---|---|---|---|---|---|---|---|
| Value | Sign | exp | Mantissa | | | | |
| 12.5 | 0 | 10010 | 1001000000 | 268337.3 | 12.625 | 304066 | 0.125 |
| 12.75 | 0 | 10010 | 1001100000 | 344551.9 | 12.875 | 390428.4 | 0.125 |
| 13 | 0 | 10010 | 1010000000 | 442413.4 | 13.125 | 501320.1 | 0.125 |
| 13.25 | 0 | 10010 | 1010100000 | 568070 | 13.375 | 643707.7 | 0.125 |
| 13.5 | 0 | 10010 | 1011000000 | 729416.4 | 13.625 | 826537 | 0.125 |
| 13.75 | 0 | 10010 | 1011100000 | 936589.2 | 13.875 | 1061295 | 0.125 |
| 14 | 0 | 10010 | 1100000000 | 1202604 | 14.125 | 1362729 | 0.125 |
| 14.25 | 0 | 10010 | 1100100000 | 1544174 | 14.375 | 1749779 | 0.125 |
| 14.5 | 0 | 10010 | 1101000000 | 1982759 | 14.625 | 2246761 | 0.125 |
| 14.75 | 0 | 10010 | 1101100000 | 2545913 | 14.875 | 2884898 | 0.125 |
| 15 | 0 | 10010 | 1110000000 | 3269017 | 15.125 | 3704282 | 0.125 |
| 15.25 | 0 | 10010 | 1110100000 | 4197501 | 15.375 | 4756392 | 0.125 |
| 15.5 | 0 | 10010 | 1111000000 | 5389698 | 15.625 | 6107328 | 0.125 |

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A circuit for calculating a non-linear function of floating-point numbers, comprising:
   a first memory unit for storing a first look-up table of a first plurality of entries;
   a second memory unit for storing a second look-up table of a second plurality of entries;
   a plurality of computation modules in respective stages of a first computation pipeline, the plurality of computation modules including:
      a first computation module in a first stage of the first computation pipeline, the first computation module configured to:
         receive one or more floating-point numbers;
         select a first entry from the first look-up table based on a first floating-point number of the one or more floating-point numbers;
         calculate, based on the first floating-point number and the first entry, a table index and a difference value; and
         output the table index and the difference value; and
      a second computation module in a second stage of the first computation pipeline, the second computation module coupled to the first computation module, the second computation module configured to:
         receive the table index and the difference value output by the first computation module;
         select a second entry from the second look-up table based on the table index; and
         calculate and output an approximate value for the non-linear function based on the difference value and the second entry.

2. The circuit of claim 1, wherein the one or more floating-point numbers include a plurality of floating-point numbers, and the first computation module includes a first plurality of computation circuits operable in parallel to:
   receive, at each of the first plurality of computation circuits, a respective floating-point number of the plurality of floating-point numbers;
   select, at each of the first plurality of computation circuits, a respective entry from the first look-up table based on the respective floating-point number; and
   calculate and output, at each of the first plurality of computation circuits, a respective table index and a respective difference value based on the respective entry and the respective floating-point number.

3. The circuit of claim 1, wherein the one or more floating-point numbers include a plurality of floating-point numbers and the first computation module outputs a plurality of table indices and a plurality of difference values corresponding to respective ones of the plurality of floating-point numbers, and wherein the second computation module includes a second plurality of computation circuits operable in parallel to:
   receive, at each of the second plurality of computation circuits, a respective a table index of the plurality of table indices and a respective difference value of the plurality of difference values;
   select, at each of the second plurality of computation circuits, a respective entry from the second look-up table based on the respective table index; and
   calculate and output, at each of the second plurality of computation circuits, a respective approximate value for the non-linear function based on the respective difference value and the respective entry.

4. The circuit of claim 1, wherein each floating-point number received by the first computation module is represented using a sign-bit, one or more exponent bits, and one or more fraction bits, and wherein the first computation module includes a first sub-circuit configured to select the first entry from the first look-up table based on the sign bit and the one or more exponent bits of the first floating-point number.

5. The circuit of claim 4, wherein each floating-point number received by the first computation module is a half-precision binary floating-point number with 1 sign bit and 5 exponent bits, the first look-up table has 64 entries, and wherein the first sub-circuit is a multiplexer configured to select the first entry from the 64 entries by indexing the first look-up table using the 1 sign bit and the 5 exponent bits.

6. The circuit of claim 1, wherein each floating-point number received by the first computation module is represented using a sign-bit, one or more exponent bits, and one or more fraction bits, wherein each entry of the first plurality of entries includes a base index, a number of most significant bits, and a seed value, and wherein the first computation module includes:
  a second sub-circuit configured to receive the first entry, to extract the base index and the number of most significant bits included in the first entry, to extract one or more significant bits from the one or more fraction bits equal to the number of most significant bits, and to use the base index and the one or more significant bits to calculate the table index; and
  a third sub-circuit configured to receive the first entry, and to extract and use the seed value included in the first entry to calculate the difference value.

7. The circuit of claim 6, wherein the second sub-circuit includes a most significant bit extractor circuit to extract the one or more significant bits from the one or more fraction bits, and an adder circuit configured to add the base index and the one or more significant bits to calculate the table index.

8. The circuit of claim 6, wherein the third sub-circuit includes a subtractor circuit configured to subtract the seed value included in the first entry from the first floating-point number to obtain the difference value.

9. The circuit of claim 1, wherein the table index output by the first computation module is an 8-bit value, the second look-up table has 256 entries, and wherein the second computation module includes a multiplexer configured to select the second entry from the 256 entries by indexing the second look-up table using the 8-bit table index.

10. The circuit of claim 1, wherein each entry of the second plurality of entries includes a plurality of coefficient values, and wherein the second computation module is further configured to calculate the approximate value using the plurality of coefficient values included in the second entry.

11. The circuit of claim 10, wherein the second computation module includes one or more sub-circuits configured to receive the plurality of coefficient values and calculate the approximate value using polynomial approximation.

12. The circuit of claim 11, wherein the one or more sub-circuits form a second computation pipeline to progressively compute the approximate value.

13. The circuit of claim 12, wherein the plurality of coefficient values includes at least 4 co-efficient values a, b, c, and d, and wherein the one or more sub-circuits includes:
  a first floating-point multiply adder circuit in a first stage of the second computation pipeline configured to receive a, b and delta, and calculate and output a first intermediate component of the approximate value based on a, b and delta, wherein delta is the difference value;
  a first floating-point multiplier circuit in the first stage of the second computation pipeline configured to receive delta, and calculate and output a second intermediate component of the approximate value based on delta;
  a second floating-point multiply adder circuit in a second stage of the second computation pipeline configured to receive c and the first intermediate component, and calculate and output a third intermediate component of the approximate value based on c and the first intermediate component;
  a second floating-point multiplier circuit configured in the second stage of the second computation pipeline configured to receive delta and the second intermediate component, and calculate and output a fourth intermediate component of the approximate value based on delta and the second intermediate component; and
  a third floating-point multiply adder circuit in a third stage of the second computation pipeline configured to receive d, the third intermediate component and the fourth intermediate component, and calculate and output the approximate value based on d, the third intermediate component and the fourth intermediate component.

14. The circuit of claim 1, wherein each entry of the first plurality of entries include values pre-determined for the non-linear function for a first pre-determined set of floating-point numbers, and each entry of the second plurality of entries include values pre-determined for the non-linear function for a second pre-determined set of floating-point numbers.

15. The circuit of claim 1, wherein the first look-up table and the second look-up table are configured so as to store a greater number of entries for a first range of floating-point numbers compared to a second range of floating-point numbers, wherein the first range and the second range are equal in size.

16. The circuit of claim 1, wherein the first look-up table and the second look-up table are programmable to hold entries corresponding to a specific non-linear function and a set of floating-point numbers.

17. A method for calculating a non-linear function for floating-point numbers, comprising:
  in an electronic circuit including a plurality of computation modules in respective stages of a first computation pipeline, the plurality of computation modules including a first computation module in a first stage of the first computation pipeline and a second computation module coupled to the first computation module and in a second stage of the first computation pipeline;
  receiving one or more floating-point numbers; and,
  for each of the one or more floating-point numbers:
    selecting, using the first computation module, a first entry from a first look-up table based on a first floating-point number of the one or more floating-point numbers;
    calculating, using the first computation module, (i) a table index and (ii) a difference value, based on the first floating-point number and the first entry;
    selecting, using the second computation module, a second entry from a second look-up table based on the table index; and
    calculating and outputting, using the second computation module, an approximate value for the non-linear function based on the difference value and the second entry.

18. The method of claim 17, wherein each entry of the first look-up table includes a base index, a number of most significant bits, and a seed value, and wherein:
  calculating the table index comprises calculating the table index based on the base index and the number of most significant bits included in the first entry; and calculating the difference value comprises calculating the difference value based on the seed value included in the first entry.

19. The method of claim 17, wherein each entry of the second look-up table includes a plurality of co-efficient values, and wherein calculating the approximate value comprises calculating the approximate value using the plurality of co-efficient values using polynomial approximation.

20. The method of claim 17, further comprising programming the first look-up table and the second look-up table to hold entries corresponding to a specific non-linear function and a set of floating-point numbers so as to store a greater number of entries for a first range of the set of floating-point numbers compared to a second range of the set of floating-point numbers, wherein the first range and the second range are equal in size.

* * * * *